US008868087B2

(12) United States Patent
Cherian et al.

(10) Patent No.: US 8,868,087 B2
(45) Date of Patent: Oct. 21, 2014

(54) RADIO ACCESS TECHNOLOGY INTERWORKING

(75) Inventors: George Cherian, San Diego, CA (US); Masakazu Shirota, Kanagawa (JP); Jun Wang, La Jolla, CA (US); Arvind Swaminathan, San Diego, CA (US); Srinivasan Balasubramanian, San Diego, CA (US); Parag A. Agashe, San Diego, CA (US); Ravindra M. Patwardhan, San Diego, CA (US); Osok Song, San Diego, CA (US); Peerapol Tinnakornsrisuphap, San Diego, CA (US); Shyamal Ramachandran, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 690 days.

(21) Appl. No.: 12/581,321

(22) Filed: Oct. 19, 2009

(65) Prior Publication Data

US 2010/0135206 A1 Jun. 3, 2010

Related U.S. Application Data

(60) Provisional application No. 61/106,897, filed on Oct. 20, 2008, provisional application No. 61/168,086, filed on Apr. 9, 2009, provisional application No. 61/169,224, filed on Apr. 14, 2009.

(51) Int. Cl.
| | |
|---|---|
| *H04W 72/00* | (2009.01) |
| *H04W 74/00* | (2009.01) |
| *H04W 36/00* | (2009.01) |
| *H04B 7/216* | (2006.01) |

(52) U.S. Cl.
CPC ............................ *H04W 36/0066* (2013.01)
USPC ........ 455/450; 455/455; 455/553.1; 455/436; 455/437; 455/438; 370/320; 370/335; 370/342; 370/441; 370/331

(58) Field of Classification Search
CPC ............................ H04W 84/045; H04W 48/16
USPC .......... 455/436–444, 455, 553; 370/320, 335, 370/342, 441, 331–334
See application file for complete search history.

(56) References Cited

U.S. PATENT DOCUMENTS

| 6,603,750 B1 * | 8/2003 | Lindskog et al. ............. 370/329 |
| 6,950,655 B2 | 9/2005 | Hunkeler |

(Continued)

FOREIGN PATENT DOCUMENTS

| EP | 0888026 A2 | 12/1998 |
| EP | 1318690 A1 | 6/2003 |
| EP | 1545146 A2 | 6/2005 |

OTHER PUBLICATIONS

International Search Report—PCT/US2009/061383—International Search Authority—European Patent Office, May 12, 2010.

(Continued)

*Primary Examiner* — Jinsong Hu
*Assistant Examiner* — Dung Hong
(74) *Attorney, Agent, or Firm* — Darren M. Simon

(57) ABSTRACT

Radio access interworking technologies allow a target network to notify a source network that a mobile device has moved from source network to target network, wherein mobile device does not need to perform notification to source network. Further, source network can provide a first subset of overhead information to mobile device and, after moving to target network, mobile device can receive a second subset of overhead information from target network. Further, mobile device can perform prehashing prior to moving to target network based on a channel list received from source network.

26 Claims, 20 Drawing Sheets

(56) References Cited

U.S. PATENT DOCUMENTS

| | | | |
|---|---|---|---|
| 7,532,887 B2* | 5/2009 | Kyung et al. | 455/439 |
| 2003/0036384 A1* | 2/2003 | Chen et al. | 455/437 |
| 2005/0073977 A1* | 4/2005 | Vanghi et al. | 370/335 |
| 2007/0211675 A1* | 9/2007 | Jain et al. | 370/338 |
| 2008/0268842 A1* | 10/2008 | Herrero-Veron | 455/435.1 |
| 2009/0036130 A1* | 2/2009 | Diachina et al. | 455/436 |
| 2010/0002650 A1* | 1/2010 | Ahluwalia | 370/331 |

OTHER PUBLICATIONS

Partial International Search Report—PCT/US09/061383, International Search Authority—European Patent Office—Mar. 16, 2010.
Written Opinion—PCT/US2009/061383—ISA/EPO—May 12, 2010.

* cited by examiner

RADIO ACCESS TECHNOLOGY INTERWORKING

CROSS-REFERENCE

This is an application claiming priority to Provisional Application No. 61/106,897 entitled "DATA SESSION SUSPEND CONTROL FROM OTHER RADIO ACCESS TECHNOLOGY" filed Oct. 20, 2008; Provisional Application No. 61/168,086 entitled "A METHOD TO OPTIMIZE CIRCUIT SWITCHED FALL BACK FROM LTE TO CDMA2000 1×RTT" filed Apr. 9, 2009; and Provisional Application No. 61/169,224 entitled "OPTIMIZED 1× PAGING METHOD IN 1×CSFB" filed Apr. 14, 2009, assigned to the assignee hereof and all of which are hereby expressly incorporated by reference herein.

BACKGROUND

I. Field

The following description relates generally to wireless communications and more particularly to interworking between radio access technologies.

II. Background

Interworking techniques between different Radio Access Technologies (RATs) can provide data session, voice call continuity, and fall back to circuit service even if a mobile device moves between different radio access technologies. Fall back refers to the situation where a mobile device user wants to make (or receive) a Circuit Switched (CS) call but the mobile device is on a technology that does not use the CS call. Therefore, mobile device has to "fall back" to a technology where the CS call is used and has to suspend a data session on the technology that does not use the CS call.

In accordance with some aspects, if the data session is not suspended, the data session is also moved to the technology where CS is used. Although interworking techniques can support fall back to circuit service, there are some cases where a target network does not support full functionalities that are supported in a source network. In that case, services can be continued, at least partially, by source network.

Switching technologies can create a problem if source network is not aware that mobile device has moved to target network (since these are independent paths). Thus, in some systems, mobile device, prior to changing networks, communicates to source network indicating that mobile device is going away for a certain duration of time. This notification procedure can produce delays that can negatively impact a user experience.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with allowing implicit suspension of certain services on one system (e.g., source system) by performing a registration, origination, page response, or any other communication on another system (e.g., target system). An indication is sent from target system to source system without an explicit indication by a mobile device on source system.

Another aspect relates to performing prehashing prior to moving from source system to target system, which can reduce an amount of delay. In accordance with some aspects, after prehashing a first subset of overhead information is received, a transfer to the target system performed, and a second subset of overhead information is received, which can be in unicast form. In accordance with some aspects, a paging message from target system is conveyed to mobile device by a page from source system. The page includes an indication that the paging message is from target system, which can mitigate mobile device performing a service request twice.

According to some aspects are radio access technology interworking pre-registration procedures. An aspect relates to a 1× registration triggered by a Mobility Management Entity (MME) change. Another aspect relates to a mobile device context transfer between MMEs. A further aspect relates to 1× Interworking Solution (IWS) using multiple MMEs for a page. Another aspect relates to a MME selection based on mobile device's identity and a 1× registration-zone.

An aspect relates to a method for inter radio access technology interworking. Method includes employing a processor executing computer executable instructions stored on a computer readable storage medium to implement the following acts. Method also includes receiving a channel list from a source network, wherein the channel list includes channels associated with a target network. Further method includes calculating a target channel and storing the target channel that needs to be read as prehash information. The target channel will be read after a transition to target network occurs.

Another aspect relates to a wireless communications apparatus comprising a memory and a processor. Memory retains instructions related to obtaining, from a source network, a channel list that includes channels associated with a target network. Memory also retains instructions related to calculating a target channel and storing the target channel as prehash information. The target channel is read after transition to target network. Processor is coupled to memory and is configured to execute instructions retained in memory.

Still another aspect relates to a wireless communications apparatus that facilitates radio access technology interworking. Wireless communications apparatus includes means for obtaining a channel list that includes channels associated with a target network. Wireless communications apparatus also includes means for calculating a target channel and means for retaining the target channel as prehash information. The channel list is obtained from a source network.

In accordance with some aspects, wireless communications apparatus includes means for reading prehash information, means for moving to target network, and means for analyzing an overhead message on target channel. According to some aspects, wireless communications apparatus includes means for receiving a first subset of overhead information from source network, means for transitioning to target network, and means for accepting a second subset of overhead information from target network in unicast mode. According to other aspects, wireless communications apparatus includes means for detecting movement within target network based on a change in a source indicator from a first globally unique temporary identifier to a second globally unique temporary identifier. In accordance with another aspect, wireless communications apparatus includes means for acquiring from source network a source network page that comprises a target network page, wherein target network page is an implicit indication to source network to suspend a current data session.

Yet another aspect relates to a computer program product comprising a computer-readable medium. Included in computer-readable medium is a first set of codes for causing a computer to receive a channel list from a source network. The channel list includes channels associated with a target network. Computer-readable medium also includes a second set of codes for causing computer to calculate a target channel as a function of the channel list and a third set of codes for causing computer to store the target channel as prehash information.

According to another aspect is at least one processor configured to transition between radio access technologies. Processor includes a first module for receiving a channel list from a source network. The channel list includes channels associated with a target network. Processor also includes a second module for calculating a target channel, wherein the target channel will be read after transition to target network occurs. Further, processor includes a third module for storing the target channel that needs to be read as prehash information.

Another aspect relates to a method utilized in a wireless communications environment. Method includes employing a processor executing computer executable instructions stored on a computer readable storage medium to implement following acts. Further, method includes detecting a mobile device has entered a target network, wherein mobile device has recently left a source network. Method also includes generating an indicator that includes an identity of mobile device and sending the indicator to source network, wherein the indicator triggers a suspend control on source network.

Still another aspect relates to a wireless communications apparatus comprising a memory and a processor. Memory retains instructions related to determining a mobile device has entered a target network from a source network, generating an indicator that includes an identity of mobile device, and conveying the indicator to source network. Processor is coupled to memory and is configured to execute instructions retained in memory.

A further aspect relates to a wireless communications apparatus that supports radio access technology interworking. Included in wireless communications apparatus is means for determining a mobile device has left a source network and entered a target network and means for creating an indicator that includes an identity of mobile device. Target network and source network support different radio access technologies. Also included in wireless communications apparatus is means for conveying the indicator to source network, wherein detecting mobile device has entered target network comprises recognizing mobile device has performed a registration, an origination, or a page request on target network. Wireless communications apparatus can also include means for sending a subset of overhead information to mobile device.

In accordance with some aspects, wireless communications apparatus includes means for retaining a mobile device context in a first mobility management entity and means for ascertaining mobile device has moved to a second mobility management entity. Also included is means for transferring mobile device context from first mobility management entity to second mobility management entity.

Yet another aspect relates to a computer program product comprising a computer-readable medium. Included in computer-readable medium is a first set of codes for causing a computer to detect a registration, an origination, or a page request on a target network from a mobile device that recently left a source network. Also included in computer-readable medium is a second set of codes for causing computer to generate an indicator that includes an identity of mobile device. Additionally, computer-readable medium includes a third set of codes for causing computer to send the indicator to source network. The indicator triggers a suspend control on source network, wherein target network and source network support different radio access technologies.

Another aspect relates to at least one processor configured to facilitate transition between radio access technologies. Processor includes a first module for detecting a mobile device has entered a target network, wherein mobile device has recently left a source network. Processor also includes a second module for generating an indicator that includes an identity of mobile device. Also included in processor is a third module for sending the indicator to source network, wherein the indicator triggers a suspend control on source network. Target network and source network support different radio access technologies.

To the accomplishment of the foregoing and related ends, one or more aspects comprise features hereinafter fully described and particularly pointed out in the claims. The following description and annexed drawings set forth in detail certain illustrative features of one or more aspects. These features are indicative, however, of but a few of various ways in which principles of various aspects may be employed. Other advantages and novel features will become apparent from the following detailed description when considered in conjunction with the drawings and the disclosed aspects are intended to include all such aspects and their equivalents.

DETAILED DESCRIPTION

Figure 1:
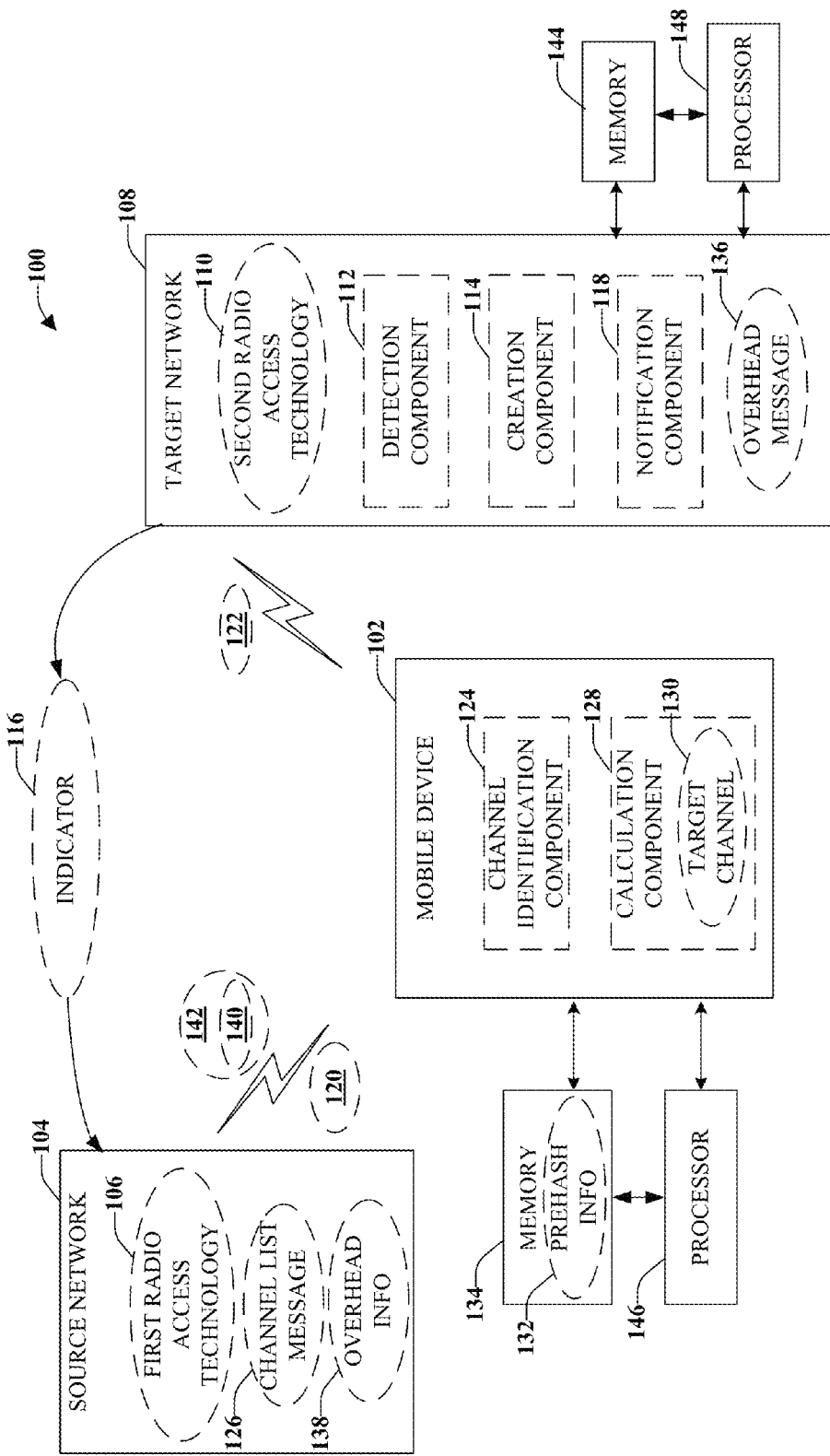
FIG. 1 illustrates a communications system that facilitates data session suspend control between Radio Access Technologies, according to an aspect.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. Components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a mobile device. A mobile device can also be called, and may contain some or all of the functionality of a system, subscriber unit, subscriber station, mobile station, mobile, wireless terminal, node, device, remote station, remote terminal, access terminal, user terminal, terminal, wireless communication device, wireless communication apparatus, user agent, user device, or user equipment (UE), and the like. A mobile device can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with wireless terminal(s) and can also be called, and may contain some or all of the functionality of, an access point, node, Node B, e-NodeB, e-NB, or some other network entity.

Various aspects or features will be presented in terms of systems that may include a number of devices, components, modules, and the like. It is to be understood and appreciated that various systems may include additional devices, components, modules, and so forth, and/or may not include all devices, components, modules, and so on, discussed in connection with the figures. A combination of these approaches may also be used.

Additionally, in the subject description, the word "exemplary" (and variants thereof) is used to mean serving as an example, instance, or illustration. Any aspect or design described herein as "exemplary" is not necessarily to be construed as preferred or advantageous over other aspects or designs. Rather, use of the word "exemplary" is intended to present concepts in a concrete manner.

FIG. 1 illustrates a communications system 100 that facilitates data session suspend control between Radio Access Technologies, according to an aspect. System 100 can be utilized in a wireless communications environment and is configured to provide a mechanism for performing a data session suspend as a wireless communications apparatus 102 or mobile device moves from a source network 104, which supports a first radio access technology 106, to a target network 108, which supports a second radio access technology 110.

First radio access technology 106 and second radio access technology 110 can be independent technologies, wherein a data session is provided to mobile device 102 on only one of the technologies at a given time. For example, first radio access technology 106 can be Long Term Evolution (LTE) and second radio access technology 110 can be CDMA2000, however, the disclosed aspects are not limited to LTE and CDMA2000 and various other technologies can be utilized, in accordance with various aspects.

For purposes of discussion, mobile device 102 is utilizing first radio access technology 106 (e.g., LTE) for data transmissions. At substantially the same time, mobile device 104 is supporting pages (e.g., a 1× (1 times Radio Transmission Technology) Circuit Switched (CS) voice call), which is supported by second radio access technology 110 (e.g., CDMA2000), wherein first radio access technology 106 does not provide the 1× CS voice call service (hereinafter referred to as CS voice call, CS call, or voice call). When mobile device 102 is to originate a voice call (e.g., when user presses a send button or initiate a CS call in another manner) or when mobile device 102 is to terminate a CS call (e.g., when user answers the phone), mobile device 102 automatically moves to second radio access technology 110 (e.g., target network 108).

Switching technologies can create a problem if source network 104 is not aware (since these are independent paths) that mobile device 102 has moved to target network 108. Thus, in some systems, mobile device 102, prior to changing networks, communicates to source network 104 to indicate that mobile device 102 is going away from source network 104 for a certain duration of time (further information related to this call flow will be provided with reference to FIG. 2 below).

The procedure of mobile device 102 notifying source network 104 that mobile device 102 is leaving before actually leaving can become a problem when a connection to source network 104 is not available. For example, mobile device 102 (user) wants to make (or wants to receive) a CS call (e.g., second radio access technology 110). Even though there was connectivity with source network 104 (e.g., an LTE data session was available), it is possible that mobile device 102 has entered an area with limited service and connectivity with source network 104 is no longer available. In this situation, mobile device 102 is not able to let source system 104 know mobile device 102 is going away because a connection is not available. At the same time, however, mobile device 104 might have connectivity with target network 108 and could access the coverage of target network 108 to complete the CS call. If mobile device 102 moves to target network 108, an issue can arise with respect to source network 104, because, in this case, source network 104 is not aware that mobile device 102 has left. Another issue that can arise is delay because if mobile device 102 has to tell source network 104 first that mobile device 102 is going away, and then move to target network 108 and try to gain access with target network 108, the overall delay for the CS call can be increased, which can negatively affect a user experience.

To mitigate at least the aforementioned issues, target system 108 includes a detection component 112 that is configured to recognize when mobile device 102 (that was registered on source network 104) performs a registration, origination, or page response on target network 108. Target network 108 is aware that mobile device 102 has transferred to target network 108 from a different radio access technology (e.g., source network 104) based on origination of a voice call or termination of a voice call and that mobile device was registered using IWS while in the different radio access technology. Based on the recognition, a creation component 114 is configured to generate an indicator 116 that includes an identity of mobile device 102 as well as other parameters needed by source network 104 to temporarily suspend services to mobile device 102. Indicator 116 provides notice to source system network 104 that mobile device 102 has transferred to target network 108. A notification component 118 sends indicator 116 to source network 104. Indicator 116 can be sent in the form of an InterRAT suspend message, according to some aspects. Thus, mobile device 102 is not performing the signaling on the source system to suspend data flow on source network 104.

At substantially the same time as receiving indicator 116, source network 104 temporarily suspends data session to mobile device 102. Thus, target network 108, on behalf of mobile device 102, informs source network 104 that mobile device 102 will not be able to listen to pages sent by source network 104, at least temporarily.

In accordance with some aspects, source network 104 includes a detection component, a creation component, and a notification component so that source network 104 can notify another system when mobile device 102 has transferred to source network 104, wherein the notification suspends a service of another system.

Figure 2:
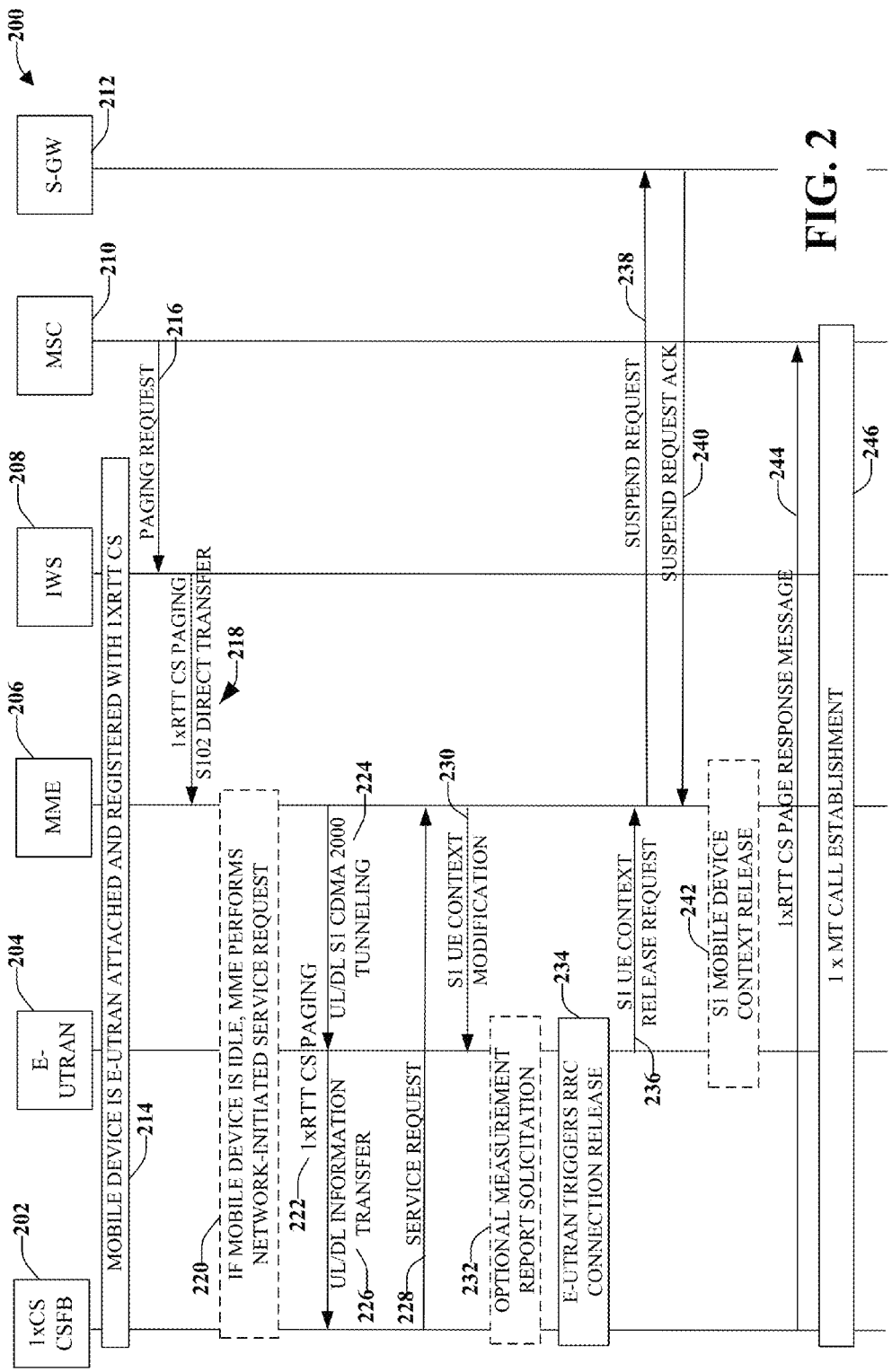
FIG. 2 illustrates a call flow for mobile termination wherein mobile device provides notice to source network.

FIG. 2 illustrates a call flow 200 for mobile termination wherein mobile device provides notice to source network. Illustrated are blocks that represent various network entities. A first modem 202 of mobile device or user equipment (UE), which can be a 1×CS CSFB modem, and a second modem 204 of mobile device, which can be an Evolved-Universal Terrestrial Radio Access Network (E-UTRAN) are illustrated. Also illustrated are a Mobility Management Entity (MME 206), a 1× Interworking Solution (1×CS IWS) (IWS 208), a Mobile Switching Center or 1×RTT MSC (MSC 210), and a Servicing Gateway (S-GW 212).

Box 214 indicates that mobile device, through first modem 202 is E-UTRAN attached and registered with 1×RTT CS. A paging request message 216 is sent from MSC 210 to IWS 208 and, at 218, a 1×RTT CS Paging (S102 Direct Transfer) is sent to MME 206. As indicated by box 220, if mobile device is idle, MME 206 performs a Network-Initiated Service Request. A 1×RTT CS paging message 222 is sent to second modem 204 and first modem 202. 1×RTT CS paging message 222 includes an Uplink/Downlink (UL/DL) S1 CDMA2000 Tunneling 224 and a UL/DL information transfer 226.

In the interworking solution between E-UTRAN/EPC (e.g., source network) and CDMA2000 1× (e.g., target network), mobile device sends a Service Request message 228 to MME 206 (a network entity in EPC) to indicate that mobile device intends to handover to CDMA2000 1× network (target network). MME 206 sends a S1 UE context Modification 230 to second modem 204. There can be an optional measurement report solicitation 232. Box 234, indicates that E-UTRAN triggers RRC connection release with redirection or Cell-Change Order (CCO) to 1×CS. At 236, there is a S1 UE context Release Request sent to MME 206.

MME 206 sends a suspend request 238 to S-GW 212 to put EPC bearer on suspend. This is necessary because CDMA2000 1× does not support EPC as a packet data core network. Thus, data session cannot be handed off to CDMA2000 1× as far as EPC framework is concerned. This suspend control prevents data coming to mobile device while it is in 1× (e.g., target network).

The call flow 200 of FIG. 2 can create a problem if mobile device is not able to send the Service Request (e.g., when mobile device suddenly looses E-UTRAN (source network) coverage). If data comes at the S-GW 212, EPC tries to deliver data to the mobile device. This unnecessary consumes E-UTRAN air interface resource for paging since mobile device is not camping on E-UTRAN. To overcome this problem, the disclosed aspects can enable suspend control even if mobile device could not send the Service Request while it is in E-UTRAN.

Figure 3:
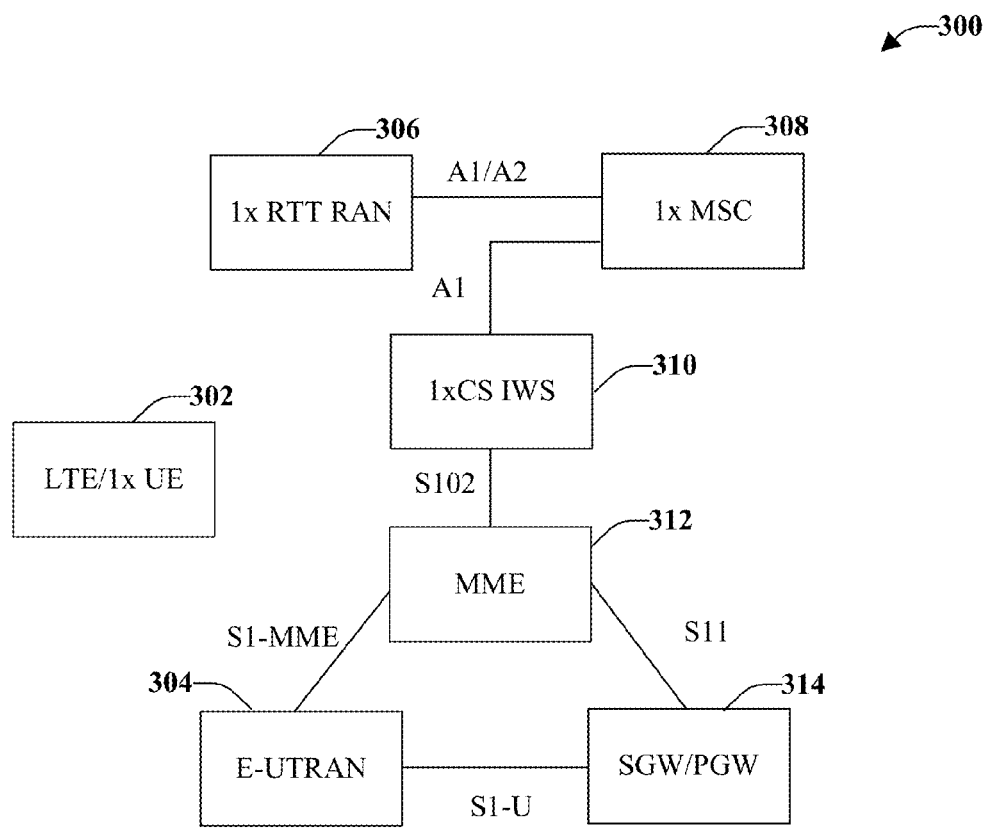
FIG. 3 illustrates an interworking architecture, according to an aspect.

FIG. 3 illustrates an interworking architecture 300, according to an aspect. The figure is for E-UTRAN (source network) and CDMA2000 1× (target network) interworking architecture, however, other technologies can be utilized with the disclosed aspects.

If mobile device 302 (e.g., LTE/1× User Equipment (UE)) is configured to tune to CDMA2000 1× network when mobile device 302 looses E-UTRAN 304 coverage, mobile device 302 tunes to CDMA2000 1× (1× RTT RAN 306) and makes a registration, origination, or page response. When MSC 308 detects mobile device 302 (that had been registered from E-UTRAN 304) is performing a registration, origination, or page response from 1× network, MSC 308 sends a notification to IWS 310. The notification indicates that mobile device 302 is now in 1× network. Then, IWS 310 supplies this information to MME 312. If MME 312 does not receive the Service Request indicating handoff to 1×, MME 312 sends a Suspend Request to a PDN GW 314. Thus, an indication from another radio access network is utilized to trigger a suspend control. This allows implicit suspension of certain services on one system by performing a registration, origination, page response, or other communications on another system. This implicit suspension is performed by means of an indication sent from target system to source system without an explicit indication by mobile device 302.

Figure 4:
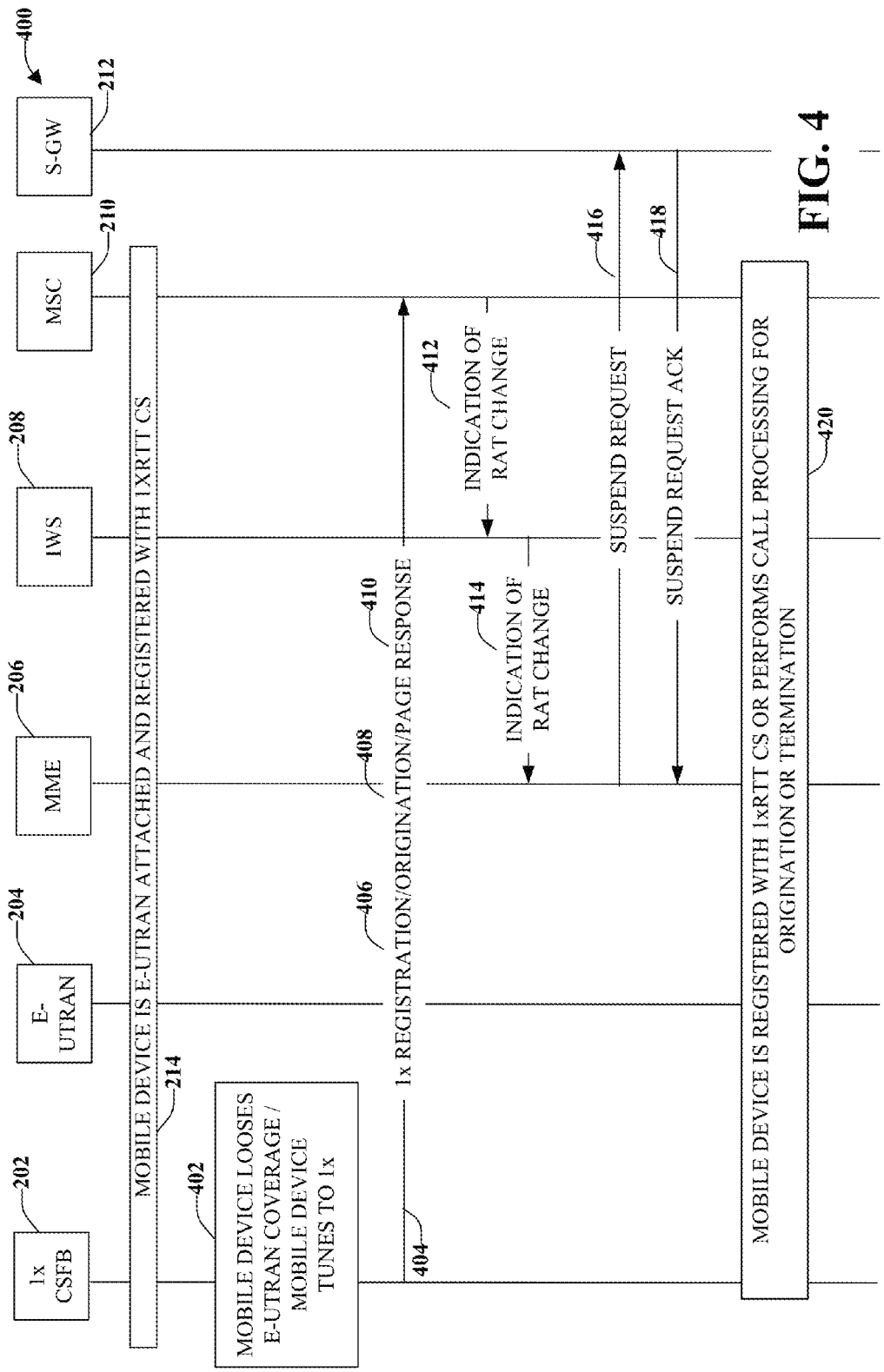
FIG. 4 illustrates a call flow of a data session suspend control from other Radio Access Technology, according to an aspect.

FIG. 4 illustrates a call flow 400 of a data session suspend control from other Radio Access Technology, according to an aspect. Similar to call flow 200 of FIG. 2, illustrated are blocks that represent a first modem 202, a second modem 204, a MME 206, an IWS 208, a MSC 210, and a S-GW 212. Box 214 indicates that mobile device is E-UTRAN attached and registered with 1×RTT CS.

At 402, mobile device looses E-UTRAN coverage. If mobile device is configured to tune to 1×RTT when it loses E-UTRAN coverage, at 404 mobile device performs a 1× registration 406, after performing 1× system acquisition. In other aspect, if mobile device had lost E-UTRAN coverage when mobile device was about to originate a CS call, 404 becomes an origination 408. In yet other aspect, if mobile device had received a 1× page message while it was in E-UTRAN, but mobile device lost E-UTRAN coverage before sending the service request becomes a 1× page response, sometimes referred to as page request 410. Further, at 404, mobile device may indicate that it registered through a different Radio Access Technology.

If MSC 210 receives a registration, origination, or page response from mobile device through 1× network, MSC 210 notifies IWS 208, at 412, that mobile device has moved to 1× (target network). In accordance with some aspects, this message is a generic message, such as "mobile is active on 1×".

IWS 208 tells MME 206, at 414, that mobile device has moved to another system (MME may not care about 1×). In accordance with some aspects, this step could be just relaying a message, at 414, or converting into another message understandable by LTE. This depends on what kinds of protocols are used in interfaces between MME 206 and IWS 208, and IWS 208 and MSC 210.

If MME 206 has not received the service request indicating handoff to 1×, MME 206 sets mobile device (or User Equipment (UE)) context to suspended status and, at 416, MME 206 sends a Suspend Request to S-GW 212 to request the suspension of EPS bearers for mobile device. At 418, the S-GW 212 acknowledges the Suspend Request message and marks mobile device as suspended. At 420, mobile device is registered with 1×RTT CS or performs call processing for origination or termination.

Referring again to FIG. 1, as discussed above, Circuit Switched Fall-Back from a source network 104 (e.g., LTE) to a target network 108 (e.g., 1×RTT) allows mobile device 102 to monitor and setup a 1×RTT circuit switched call by temporarily leaving source network 104. In addition, pages are sent on source network 104 (e.g., source network page 120) so that mobile device 102 does not have to monitor pages on target network 108 (e.g., target network page 122). Previously, mobile device 102 tuned to target network 108 and then performed regular access procedure on second network 108 (e.g., 1×RTT). Since mobile device 102 might not have the latest overhead parameters, the call setup might take longer than a regular target network 108 call. Thus, various aspects disclosed herein relate to attempting to optimize call setup time, without making extensive changes to deployed systems.

In accordance with some aspects, there are at least two aspects to improve call setup time. The first aspect involves pre-hashing a 1×RTT (target network 108) channel before transitioning to target network 108 and tune to the "hash-to channel". The second aspect expands the first aspect and includes acquisition of target network 108 traffic channel based on a partial overhead, and post-reading the overhead parameters to resume regular target network 108 traffic channel operation.

An advantage of the disclosed aspects is that the disclosed aspects can be utilized with minimal changes to deployed systems. Further, the disclosed aspects can mitigate a call setup time (e.g., by around 1.28 seconds to about 1.68 seconds on average (about 70-80% reduction in call setup time)).

When mobile device 102 is in tunnel mode (e.g., connected to source network 104 for packet data session, while still capable of obtaining packets), there is a tunnel established between mobile device 102 and target network 108. Whenever there is a page (over the RAT technology) instead of paging mobile device 102 on second radio access technology 110, mobile device 102 is being paged through source network 104 using a tunnel (e.g., while mobile device 102 is connected on source network 104, mobile device 102 is also on a tunneled connection with CS technology (though target network 108)).

For example, source network 104 can be LTE and target network 108 can be 1×. The purpose of moving to target network 108 can be to either receive a call for which the page has already come over the tunnel or the user presses the send key and wants to originate a call or to send an SMS. Once mobile device 102 leaves source network 104, mobile device 102 has to access target network 108 and, in the case of 1×, there are certain procedures already defined in 1× related to how mobile device 102 can access the 1× system. One procedure is that mobile device 102 has to receive an overhead message and has to perform a channel hashing. Channel hashing means to distribute the load on the 1× system and mobile device 102, based on its IMSI (International Mobile Station Identity), hashes to one of the channels, which can help distribute the system load. To perform the 1× origination/termination call, mobile device 102 leaves source network 104 and moves to target network 108. Upon transferring to target network 108, mobile device 102 reads the overhead messages and performs the channel hashing and then mobile device 102 has to read overhead message again because the overhead message for channels to which it hashed might be slightly different from the overhead message that mobile device 102 already read. Because of this, there is a delay incurred (e.g., about a few seconds). In other words, mobile device leaves source network 104, comes to target network 108 and before mobile device 102 can access target network 108, mobile device 102 has to perform some functions that add delay. This delay can negatively impact a user experience because the user either originated a call, or desires to receive a call, but there is a delay before either function can be performed.

To overcome the above mentioned problems, the following aspects relate to operations that can be performed while mobile device 102 is in tunneled mode. In accordance with some aspects, additional parameters necessary on System Information Block 8 (SIB8) are identified. The following will discuss four options to acquire target network 108 (1×RTT) traffic channel. A first option relates to prehashing. A second option relates to bypassing overhead update procedures. A third option relates to a LTE redirection message that contains a channel-list message. A fourth option relates to a partial overhead in the redirection message.

A brief example will be provided to illustrate the concept of prehash, which is a first option. Mobile device 102 (of FIG. 1) has a set of CDMA channels while on source network 104 (e.g., LTE system) and mobile device 102 can perform a hash operation even though mobile device 102 is not on target network 108. Thus, mobile device 102 includes a channel identification component 124 that is configured to receive a channel list message 126, which indicates the channels that would be transmitted in order for mobile device 102 to transfer to target network 108. Channel identification component 124 can be made aware of these channels through source network 104 (e.g., LTE system).

Mobile device 102 also includes a prehash calculation component 128 that is configured to determine what channels would be transmitted in order for the mobile device 102 to go to target network 108 (e.g., 1×). Thus, calculation component 128 calculates what channel (e.g., target channel 130) mobile device 102 would have to read if on target network 108 (e.g., 1× system) before actually moving to the target network 108 (e.g., 1× system). The operation performed by calculation component 128 is referred to as a prehash operation. Thus, after mobile device 102 moves from source network 104 (e.g., LTE) to target network 108 (e.g., 1×), mobile device 102 does not have to read the overhead message on one channel and then hash to the new channel.

This is to say, mobile device 102 (e.g., calculation component 128) performs prehash while on source network 104 and stores that prehash information 132 in storage media, such as a computer readable storage medium 134 or memory. Then, when mobile device 102 moves to target network 108, mobile device 102 reads an overhead message 136 on target channel 130 after the hash operation. This can save time when moving between networks (or radio access technologies) since hashing is expensive from a time perspective.

Figure 5:
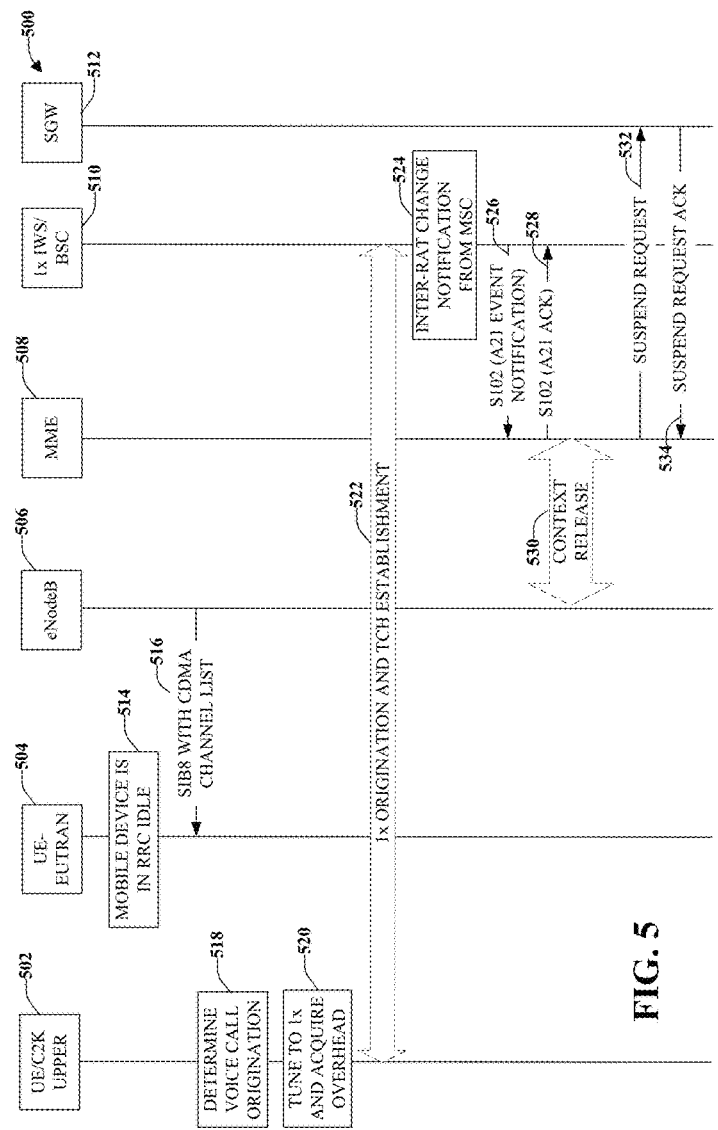
FIG. 5 illustrates a mobile originated (MO) call flow for a pre-hash operation, according to an aspect.

FIG. 5 illustrates a mobile originated (MO) call flow 500 for a pre-hash operation, according to an aspect. This figure corresponds to first option. Call flow 500 includes boxes that represent various entities. A first modem 502 (e.g., user equipment (UE)) c2K upper (modem)) and a second modem 504 (e.g., UE/EUTRAN) of mobile device are illustrated. It should be noted that first modem 502 and second modem 504 are included on a single mobile device. An eNodeB is illustrated, at 506 and a MME is illustrated, at 508. Also illustrated are a 1× IWS/BSC 510 and a SGW 512.

At 514, mobile device is in RRC Idle when eNodeB 506 sends a SIB8 with CDMA Channel list 516. First modem 502 determines a voice call origination, at 518, and tunes to 1× and acquires overhead, at 520. At 522 a 1× origination and TCH establishment between first modem 502 and IWS/BSC 510 is performed. An inter-RAT change notification from MSC 524 is received at IWS/BSC 510, which transmits an S102 (A21 Event Notification) 526. In reply, a S102 (A21 Acknowledgement) 528 is received. A User Equipment (UE) context is released, at 530. MME 508 sends a suspend request, at 532. If acknowledged, SGW 512 replies to MME 508 with a suspend request acknowledgement 534.

Figure 6:
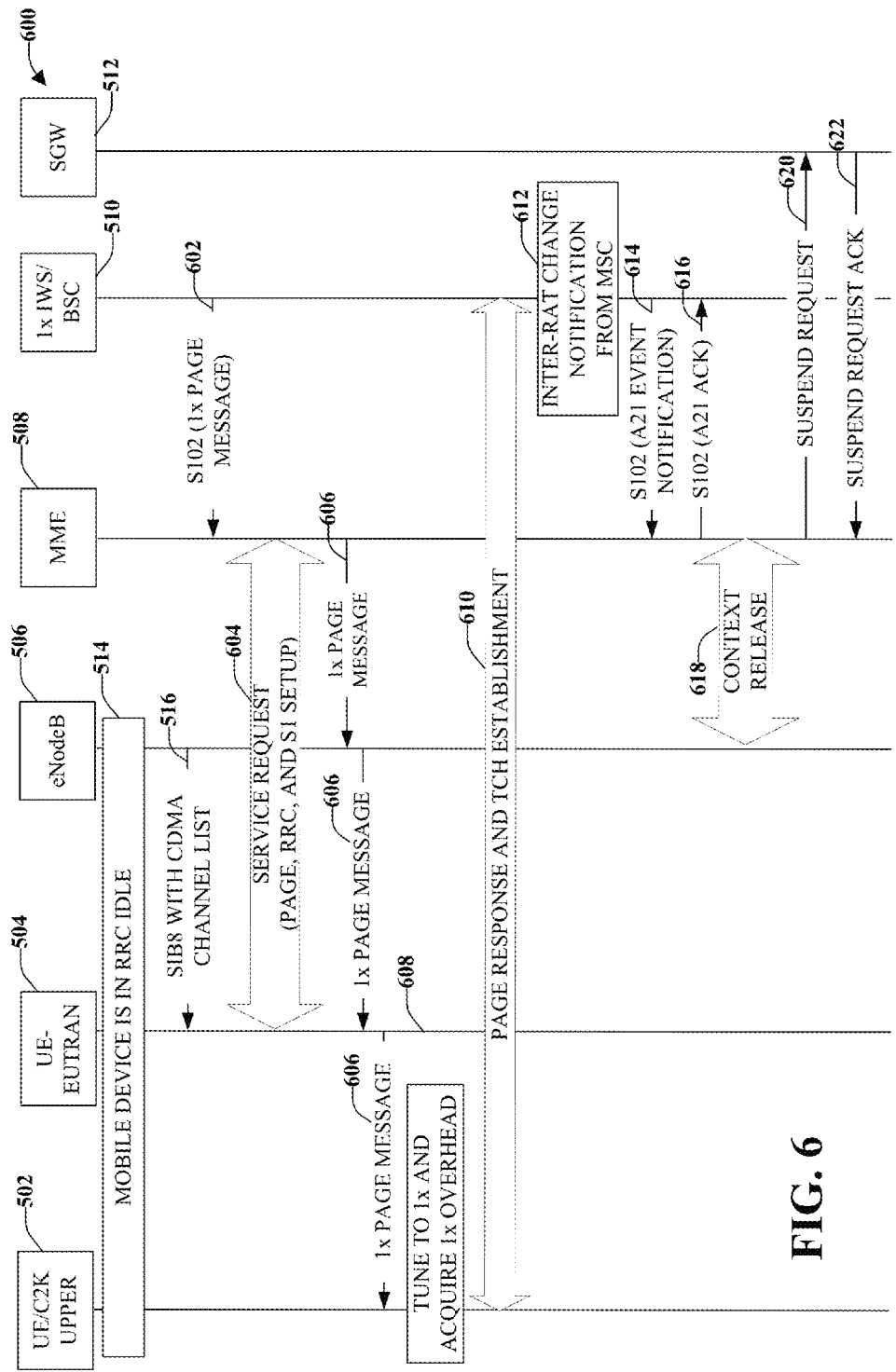
FIG. 6 illustrates a mobile terminated (MT) call flow for a pre-hash operation, according to an aspect.

FIG. 6 illustrates a mobile terminated (MT) call flow 600 for a pre-hash operation, according to an aspect. This figure corresponds to first option. Similar to the above figure, as indicated, at 514, mobile device is in RRC idle and an SIB8 with CDMA channel list is sent from eNodeB 506, at 516. A S102 (1× Page Message) 602 is sent from IWS/BSC 510 to MME 508. A Service Request (Page, RRC and S1 setup) 604 is performed between MME 508 and second modem 504. MME 508 sends eNodeB 506 a 1× Page Message 606 and eNodeB 506 relays the 1× Page Message 606 to second modem 504, and first modem 502. First modem 502 tunes to 1× and acquires 1× overhead, at 608. Page response and TCH establishment between first modem 502 and IWS/BSC 510 occurs, at 610.

An inter-RAT change notification from MSC 612 is received at IWS/BSC 510. A S102 (A21 Event Notification) 614 is sent to MME 508 and MME 508 responds with a S102 (A21 Acknowledgement) 616. Context release 618 is performed. A suspend request 620 is sent to SGW 512, which replies with a suspend request acknowledgement 622.

With reference again to FIG. 1, bypassing overhead update procedures can further mitigate the amount of time needed to read the overhead message (e.g., option two) after mobile device 102 transitions to target network 108. Thus, mobile device 102 performs prehash, as discussed above, and moves to target network 108 (e.g., 1×) when needed (e.g., to originate a call, to terminate a call). After moving to target network 108, mobile device 102 performs a post reading of the overhead information.

In accordance with this aspect, mobile device 102 can receive partial overhead information 138, which can be received from source network 104 (e.g., LTE). Normally, mobile device 102 would have full overhead to access traffic, however, the disclosed aspects initially provide a partial overhead (which can be quicker). Partial overhead is the minimal information given to mobile device 102 before access happens. If mobile device 102 has partial overhead information 138, mobile device 102 can avoid reading the overhead messages on target network 108 (e.g., 1×) before the access is performed on target network 108.

Once mobile device 102 gets into the traffic channel in target network 108, the remainder of the overhead message can be sent to mobile device 102. The remainder of the overhead messages provide parameters need by mobile device 102 to operate on the traffic channel. The remainder of the overhead message can be sent to mobile device 102 in unicast form. Thus, a majority of overhead messages can be sent as a part of the unicast (this is a post reading of the overhead) but mobile device 102 can also read partial overhead.

Figure 7:
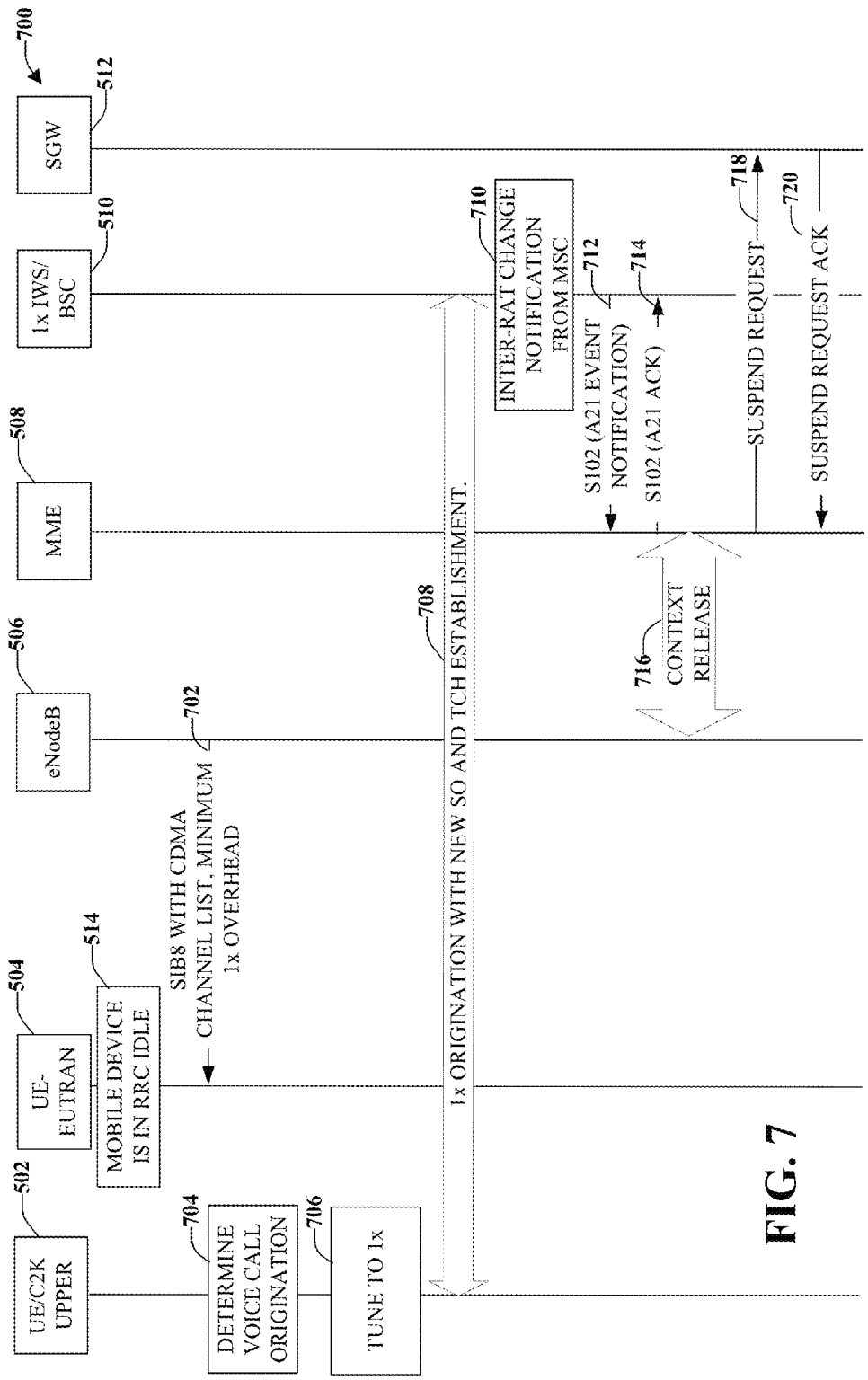
FIG. 7 illustrates a mobile originated (MO) call flow for bypassing overhead update procedures, in accordance with an aspect.

FIG. 7 illustrates a mobile originated (MO) call flow 700 for bypassing overhead update procedures, in accordance with an aspect. This figure corresponds to option two, which is post reading of overhead messages.

Call flow 700 starts when a mobile device is in RRC Idle 514. At 702, eNodeB 506 sends a SIB8 with CDMA Channel list 702 (minimum 1× overhead). Mobile device determines voice call origination 704 and, at 706, tunes to 1×. At 708, is a 1× origination with New SO and TCH establishment. 1× overhead information is provided in Traffic System Parameters message.

As a function of an inter-RAT channel notification from MSC 710, an S102 (A21 Event Notification) 712 is sent to MME 508, which responds with a S102 (A21 Acknowledgement) 714. Context Release occurs, at 716. A suspend request 718 is sent to SGW 512, which responds with a suspend request acknowledgement 720.

Figure 8:
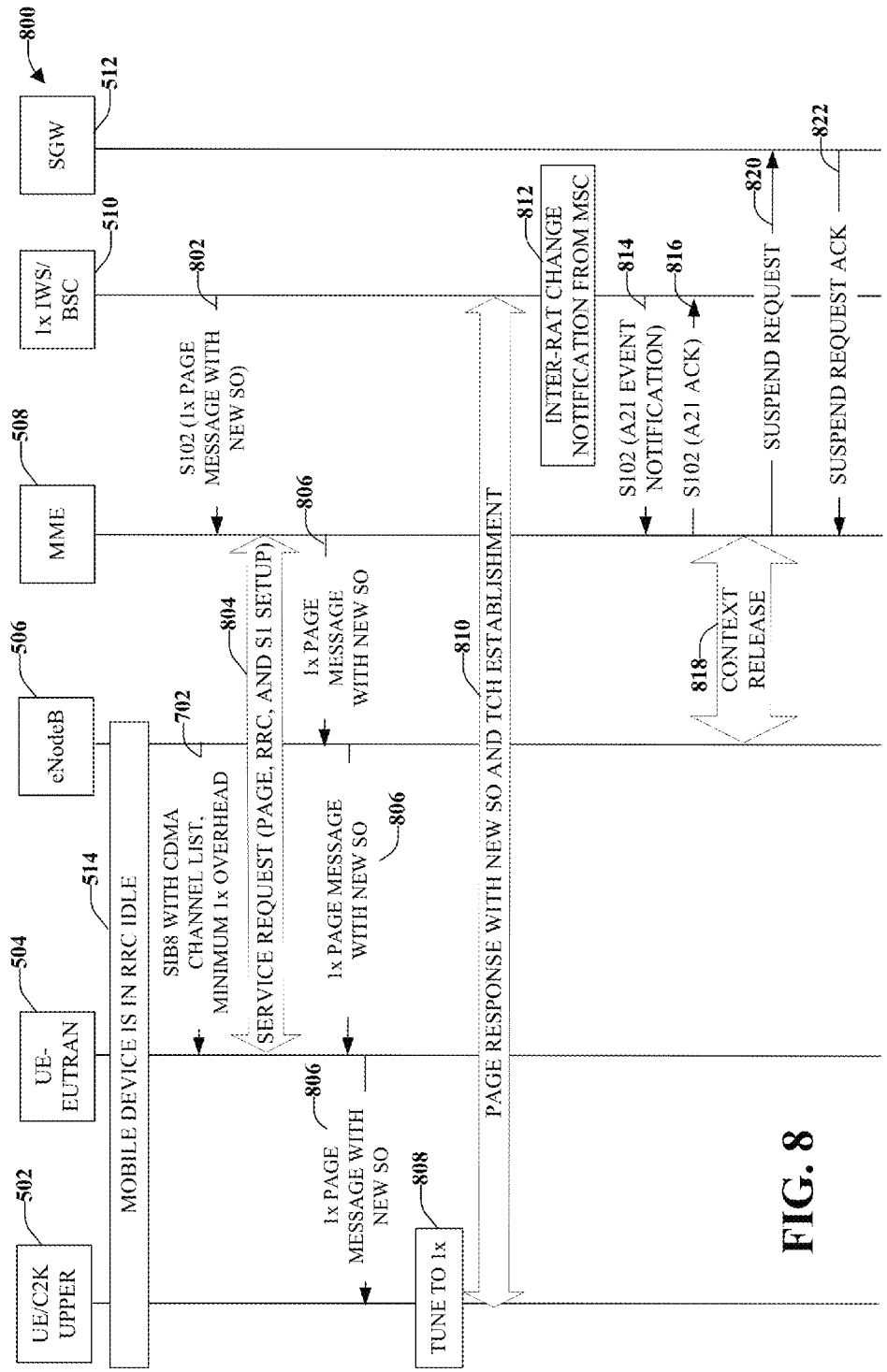
FIG. 8 illustrates a mobile terminated (MT) call flow for bypassing overhead update procedures, according to an aspect.

FIG. 8 illustrates a mobile terminated (MT) call flow 800 for bypassing overhead update procedures, according to an aspect. This figure corresponds to option two, which is post reading of overhead messages. Similar to the above figure, mobile device is in RRC Idle 514 and a SIB8 with CDMA channel list 702 is received. MME 508 can send a S102 (1× Page Message with new SO) 802 to IWS/BSC 510. Service Request (Page, RRC, and S1 setup) 804 occurs between mobile device and MME 508. MME 508 sends a 1× Page Message with new SO 806 to eNobeB 506, which relays the 1× Page Message with new SO 806 to second modem 504 and first modem 502. First modem 502 tunes to 1×, at 808. At 810, a page response with new SO and TCH establishment, 1× overhead information is provided in Traffic System Parameters message and TCH establishment 810 occurs. An Inter-RAT change notification 812 from MSC is received and IWS/BSC 510 sends a S102 (A21 Event Notification) 814 to MME 508, which replies with a S102 (A21 Acknowledgement) 816. There is a context release 818 and a suspend Request 820 is sent to SGW 512, which replies with a suspend request acknowledgement 822.

With reference again to FIG. 1, in accordance with some aspects, another option (e.g., third option), which is similar to the option discussed with reference to FIGS. 5 and 6, can be utilized wherein a channel list message 140 is sent through a redirection message 142. In this aspect, the channel list message 140 can come as part of the LTE redirection message 142. Thus, instead of being transmitted anonymously by the LTE (source network 104), the channel list information 140 is only sent to mobile device 102 when mobile device 102 needs to perform a handoff from source network 104 (LTE) to target network 108 (1×) (fallback) so there could be a redirection message 142 to mobile device 102 at that time. This option can be utilized when mobile device 102 has the opportunity to notify source network 104 that mobile device 102 is leaving and services should be suspended (at least temporarily). This aspect can improve latency of 1×CSFB with existing procedures. Further, the LTE redirection message can be modified to support multiple frequencies. In addition, the LTE redirection message can contain channel-list message. Additionally, mobile device 102 can hash in order to correct frequency to decrease delay.

In accordance with some aspects, at least a subset of parameters can be provided as part of the redirection message (e.g., partial 1×RTT overhead in the redirection message), which is the fourth option. The subset of parameters can be information required by mobile device 102 to access target network 108 (e.g., access steps, power, and so forth). In the case when redirection from source network 104 (LTE) to target network 108 (1×RTT) is deployed, the redirection message could carry a minimal set of 1×RTT overhead parameters that is just enough parameters for mobile device 102 to perform the access procedure. The minimal overhead can include access parameters (that are otherwise carried in 1×RTT Access Parameters Message) and initial traffic channel setup procedures. The redirection message is from source network 104 (LTE) (not from target network 108 (1×), only the page comes from target network 108).

With continuing reference to FIG. 1 and, as discussed above, a circuit switch fallback position can be supported that enables mobile device 102 to send target network 108 (1×) Registration and receive target network 108 (1×) page message while mobile device 102 camps on first network 104 (E-UTRAN). For example, whenever 1×CSFB is triggered, mobile device 102 needs to connect E-UTRAN by performing an extended service request to fall back to 1× (target network 108). E-UTRAN sends the redirection information to mobile device 102. In the Mobile Termination case while mobile device 102 is in idle state, the MME first performs the network initiated service request to bring up RRC connection. Then, it forwards 1× page message to mobile device 102. Then, mobile device 102 performs the extended service request to fall back to. By doing these series of procedures, a call set up time for 1×CSFB becomes much longer than the native 1× mode.

The following aspects improve the paging procedure for 1× circuit switch fall back (CSFB). According to these aspects, performing the service request twice (service request for RRC establishment and service request for 1×CSFB) is avoided. A benefit of the disclosed aspects, unlike 1×CSFB Mobile Termination procedure, is that this aspect does not perform the service requests in E-UTRAN/EPC, which can reduce a call set up time.

First, when the MME receives an 1× paging message over S102 interface, it sends an EPC page message with 1× page indicator if mobile device 102 is in RRC Idle state. Next, if mobile device 102 receives an EPC page message with 1× paging indicator, mobile device 102 tunes to 1×. Then, since actual 1× page message is not delivered to mobile device 102, mobile device 102 locally configures the page message as if it is received over the air. Alternatively, mobile device 102 configures the 1× page response message based on the pre-configured information. Then, mobile device 102 sends a Page Response Message in 1× network.

When, source network 104 receives a target network 108 page, the page appears as a data packet as far as source network 104 is concerned. Thus, source network 104, receives the data packet and pages mobile device 102. Mobile device, accesses (service request) source network 104 and obtains the data, which in this case the data is another page. Based on this page, mobile device 102 has to send a second service request, indicating that mobile device 102 is transferring to target network 108 (since target network 108 supports the page (or CS call)).

To mitigate having to send two service requests, when source network 104 (e.g., MME) receives the target network 108 (1×) page over S103 interface, source network 104 sends an ECP page, which indicates the page is a 1× (target network 108) page. Then the data suspension can be performed locally. Thus, source network 104 tells mobile device 102 that source network 104 will suspend the data session. In this manner, mobile device 102 does not need to get back to source network 104 and try to access the data and find out that the data is a target network 108 page. Therefore, source network 104 realizes it is a 1× page and, in accordance with some aspects, source network 104 can send the target network 108 page along with the source network 104 page so that mobile device 102 has all the information mobile device 102 needs to switch from source network 104 to target network 108.

Figure 9:
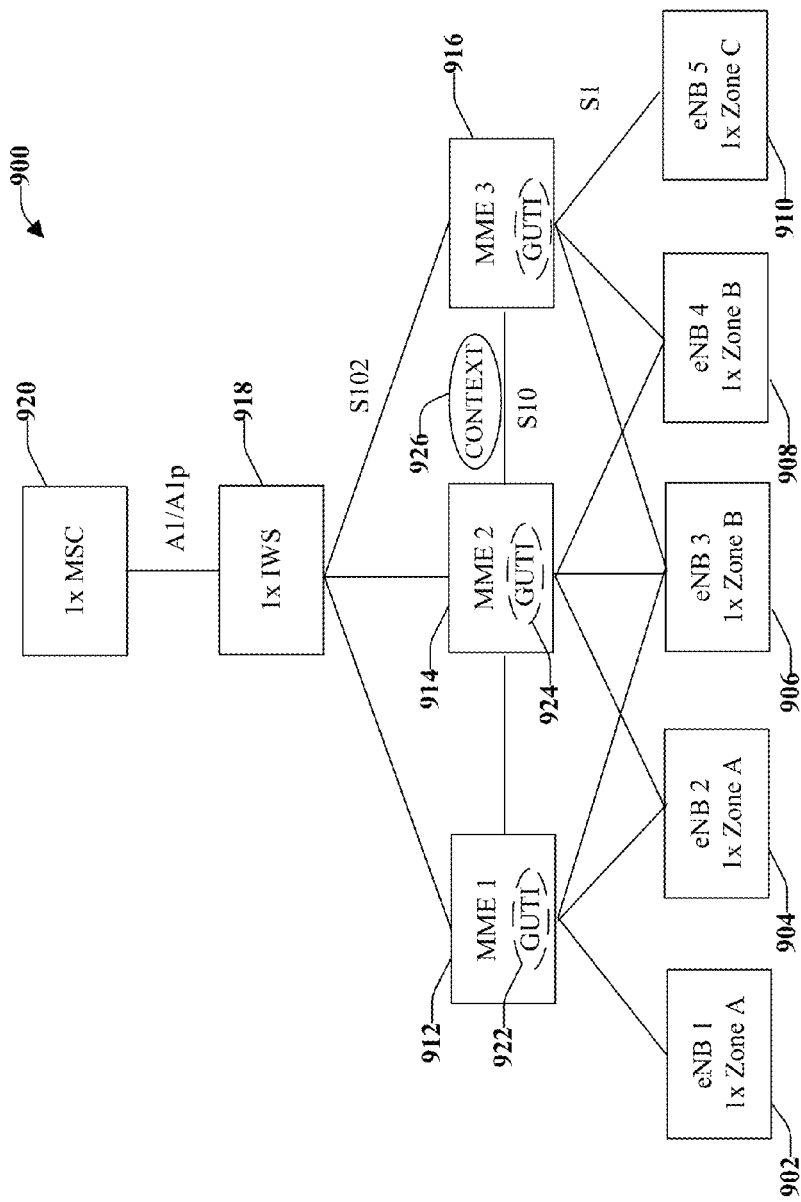
FIG. 9 illustrates an example Evolved Packet Core/Evolved-Universal Terrestrial Radio Access Network configuration, according to an aspect.

With reference now to FIG. 9 illustrated is an example EPC/E-UTRAN configuration of a wireless communications environment 900, according to an aspect. As previously discussed, when a mobile device is on a source network (such as LTE), mobile device is virtually connected to a target network (such as 1×) using source network as a bearer (e.g., there is a virtual tunnel between mobile device and 1×). Due to this, a problem can develop as mobile device is moving around within source network (e.g., LTE system). For example, mobile device might move between various nodes, such as eNb1 902, eNB2 904, eNB3 906, eNB4 908, and/or eNB5 910. As illustrated eNb1 902, eNB2 904, eNB3 906 are connected to a first mobility management entity 912 (MME1), eNB2 904, eNB3 906, and eNB4 908 are connected to a second mobility management entity 914 (MME2), and eNB3 906, eNB4 908, and eNB5 910 are connected to a third mobility management entity 916 (MME3). Further, MME1 912, MME2 914, and MME3 916 are connected to IWS 918 and MSC 920. As mobile device moves around, the S102 interface has to be moving between different MMEs (e.g., between first mobility management entity 912 and second mobility management entity 914 and/or third mobility management entity 916), otherwise mobile device will not be reachable. However, moving between different MMEs can be a problem.

For example, 1× Circuit Switch Fall Back (CSFB) is a manner of supporting circuit services with E-UTRAN. In order to support 1× paging while mobile device attaches to E-UTRAN/EPC, mobile device performs 1× registration over a tunnel to a 1× network provided through an Evolved NodeB (eNB) and Mobility Management Entity (MME) in E-UTRAN/EPC network. For example, a 3GPP EPC architecture allows MME footprint overlap among eNBs (as illustrated in FIG. 9).

A mobile device supporting 1×CSFB performs the 1× registration over E-UTRAN when mobile device finds 1× registration zone change listed in the System Information Block 8 (SIB 8) broadcasted from eNB. For example, mobile device registers from eNB 3 with 1× zone B. When mobile device moves to eNB2, mobile device performs the 1× registration as 1× zone changes from B to A. At this moment, MME is not relocated since both eNB2 and eNB3 connects to MME2. Then, mobile device further moves to eNB1. Since eNB1 no longer reaches MME2, eNB1 performs the attach procedure with MME relocation. However, eNB1 broadcasts 1× Zone A in its SIB 8. Mobile device does not perform the 1× registration. If this happens, the 1× IWS cannot know mobile device has moved to the coverage under MME1. If a page message comes, the 1× IWS forwards the page message to MME2 through a S102 interface as the 1× registration was performed by MME2. However, mobile device is not in under MME2 (there is no (User Equipment) UE context). Then, the page fails.

This issue becomes more important if 1× registration zone list is used. Mobile device can maintain multiple 1× registration zones. As long as mobile device moves within the listed zones (valid until timer expires), mobile device does not perform the 1× registration. If up to three zones are allowed to register in the example, mobile device does not perform registration as long as mobile devices moves around eNBs illustrated. However, MME relocation happens at the boundaries between eNB1 and eNB2, and eNB4 and eNB5.

In LTE-eHRPD interworking scenario, there is a similar issue with S101 interface (between MME and eHPRD AN) relocation. The S101 interface must be kept between an MME that has mobile device's context and eHPRD AN since eHPRD AN could send an AlternateLinkPage to mobile device or initiate the session renegotiation with mobile device.

To solve this problem, there are at least four options that can be utilized, according to an aspect. It should be noted that the disclosed aspects can apply to other Radio Access Technologies Interworking scenario that require the pre-registration from source RAT (e.g., LTE-eHRPD interworking). The 1× registration is used an example use case for pre-registration for purposes of explaining the one or more disclosed aspects.

A first option relates to 1× registration trigged by MME change. For example, a LTE modem is communicating the MME identity to a 1× modem. The MME can be identified using the GUTI (globally unique temporary identifier). For example, a first globally unique temporary identifier 922 can be associated with MME1 914 and a second globally unique temporary identifier 924 can be associated with MME2 914. If the GUTI changes (e.g., from first globally unique temporary identifier 922 to second globally unique temporary identifier 924), mobile device on the LTE side knows mobile device is moving from one MME to another MME. Mobile device uses the GUTI change as an additional trigger for 1× registration. By doing this, the IWS can track the mobile device's location correctly. In that way mobile device can keep moving the S102 interface to appropriate MME. Whenever MME has the appropriate page to send there is a tunnel between the IW and appropriate MME so mobile device is always reachable.

A second option relates to a mobile device context transfer between MMEs. A 1× registration is costly because the IWS has to be able to handle (and coordinate) the multiples registrations. Thus, in accordance with an aspect, an MME (e.g., MME3 916) can transfer the mobile device context 926 as mobile device moves to a direct MME. Mobile device context 926 includes the status of the 1× registration (source of MME, status of 1×) and when a target MME receives mobile device context, the context includes the 1× registration status. In accordance with some aspects, the target MME can perform a S102 relocation (A21), wherein the S102 is relocated and IWs can simply send the 1× message as appropriate.

Thus, mobile device context 926 stored in source MME (e.g., MME3 916) is transferred to target MME (e.g., MME2 914). Mobile device context 926 also includes the status of the 1× registration. If the 1× registration has been performed, the source MME stores the status of 1× registration in mobile device context. When target MME receives mobile device context including 1× registered status, target MME performs S102 relocation. The S102 relocation is to tell the A21 end point change to the 1× IWS. After S102 relocation is performed, the 1× IWS sends A21 messages to the new endpoint (e.g., MME). The 1× IWS can always send 1× messages to the appropriate MME.

A third option involves the 1× IWS utilizing multiple MMEs for the page. In accordance with this aspect, when the 1× IWS needs to send an 1× message, it sends the page to the MME that was used for 1× registration (or used previously). If the IWS finds mobile device no longer resides under that MME coverage (there could be explicit error indication from the MME, or timer expiration at 1× IWS), the IWS tries another MME that belongs to the same 1× registration zone. The IWS repeats this procedure until it finds the MME that has the mobile device context. In accordance with some aspects, a 1× message is sent to all MMEs that belong to the same 1× registration zone list. The MME that has the mobile device context pages the mobile device.

A fourth option is MME selection based on mobile device's ID and 1×-registration-zone. In this option, a mesh topology is assumed between MMEs and eNBs in a 1× registration zone (wherein a 1× registration zone list might not be utilized for this aspect). The eNB selects the MME based on mobile device's ID (e.g., S-TMSI), the registration-zone, and subscription information. A RAN specific hash algorithm, which can be network operator/vendor specific, is used so that the same MME is always selected for a particular mobile device and a 1×-registration-zone. In this case, the MME relocation happens only when the 1×-registration zone changes.

With further reference to FIG. 1, system 100 can include respective memories operatively coupled (internally or externally) to mobile device 102, source network 104, and target network 108. For example, memory 134 coupled to mobile device 102 can retain instructions related to obtaining a channel list from a source network, calculating a target channel, and storing the target channel as prehash information. In accordance with some aspects, mobile device memory 134 can retain further instructions related to reading prehash information, transitioning to target network 108, and reading an overhead message on a target channel. Further, mobile device memory 134 can retain further instructions related to receiving a first subset of overhead information, transitioning to target network 108, and receiving a second subset of overhead information. Additionally, mobile device memory 134 can retain additional instructed related to receiving a redirection message, notifying source network 104 to suspend a session, and moving to a target network identified in the redirection message. Alternatively, mobile device memory 134 can include instructions related to receiving a source network page that include a target network page and an indication that source network will suspend a current data session. Further, mobile device memory 134 can retain further instructions related to identifying motion within target network based on a change from a first globally unique temporary identifier to a second globally unique temporary identifier.

In accordance with some aspects, computer readable storage medium or memory 144 of target network 108 can retain instructions related to detecting mobile device 102 has entered target network 108, generating an indicator that includes an identity of mobile device 102, and sending the indicator to source network. In accordance with some aspects, target network memory 144 retains instructions related to determining target network 108 and source network 104 support different radio access technologies before generating the indicator. Further, target network memory 144 can retain instructions related to sending a subset of overhead information to mobile device after detecting mobile device has entered target network. Additionally or alternatively, target network memory 144 retains further instructions related to storing a mobile device context in a first Mobility Management Entity of target network, determining mobile device has moved to a second Mobility Management Entity of target network, and transferring mobile device context from first Mobility Management Entity to second Mobility Management Entity.

At least one processor 146, 148 can be operatively connected to each memory 134, 144 to facilitate analysis of information related to radio access technology interworking in a communication network. Processors 146, 148 can be a processors dedicated to analyzing and/or generating information, processors that controls one or more components of system 100, and/or processors that both analyzes and generates information received and controls one or more components of system 100.

Processor 146 can be configured to transition between radio access technologies. Processor 146 can include a first module for receiving a channel list from a source network. The channel list can include channels associated with a target network. Processor 146 can also include a second module for calculating a target channel, which will be read after transition to target network occurs. Further, processor 146 can include a third module for storing the target channel that needs to be read as preshash information. In accordance with some aspects, processor 146 includes a fourth module for receiving, from source network, a source page that comprises a target network page. Target network page can be an implicit indication to source network to suspend a current data session.

Processor 148 can be configured to facilitate transition between radio access technologies. Included in processor 148 can be a first module for detecting a mobile device has entered a target network, wherein mobile device has recently left a source network. Processor 148 can also include a second module for generating an indicator that includes an identity of mobile device. Further, processor 148 can include a third module for sending the indicator to source network. The indicator can trigger a suspend control on source network. Target network and source network can support different radio access technologies. In accordance with some aspects, processor 148 includes a fourth module for sending, in unicast mode, a subset of overhead information to mobile device after first module detects mobile device has entered target network.

In view of exemplary systems shown and described above, methodologies that may be implemented in accordance with the disclosed subject matter, will be better appreciated with reference to various flow charts. While, for purposes of simplicity of explanation, methodologies are shown and described as a series of blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g. device, system, process, component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 10:
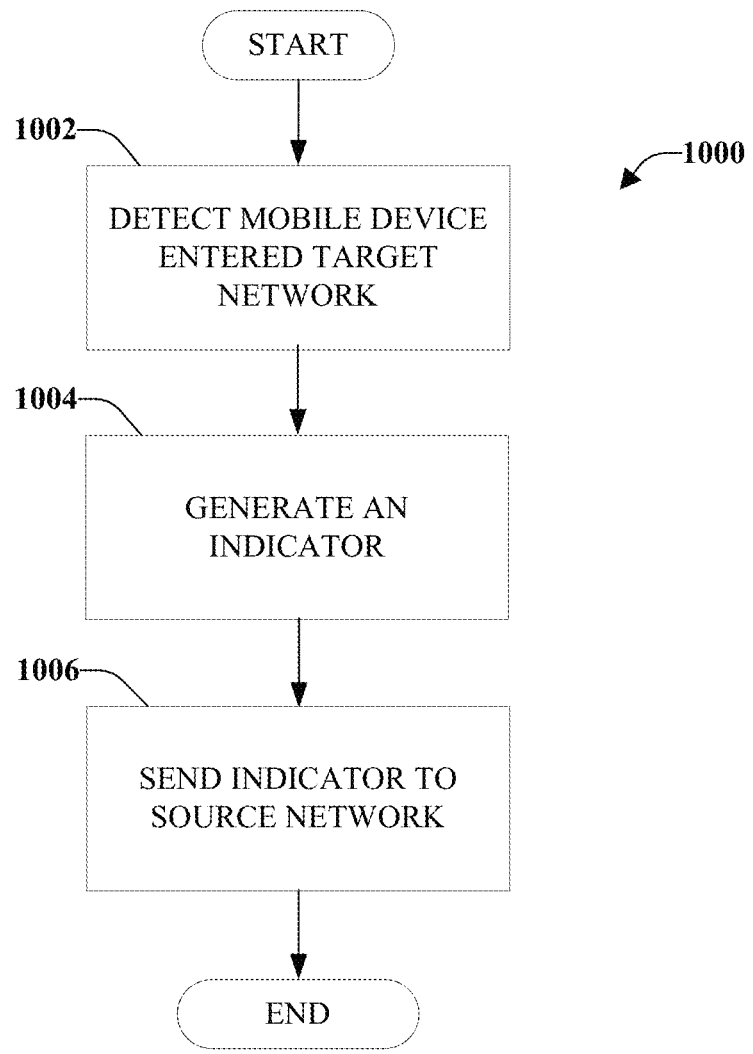
FIG. 10 illustrates a method for inter-radio access technology interworking that facilitates data session suspend control from another radio access technology, according to an aspect.

FIG. 10 illustrates a method for inter radio access technology interworking 1000 that facilitates data session suspend control from another radio access technology, according to an aspect. Method 1000 is configured to send a suspend control message on behalf of a mobile device. An indication from another radio access network is utilized to trigger a suspend control. Method 1000 starts, at 1002, when it is detected that a mobile device has entered a target network, wherein mobile device has recently left a source network. Target network and source network can support different radio access technologies. In accordance with some aspects, detecting mobile device has entered target system comprises recognizing mobile device has performed a registration, an origination, or a page request on target system.

At 1004, an indicator that includes an identity of mobile device is generated. The indicator triggers a suspend control on source network. In accordance with some aspects, the indicator is only generated if target network and source network support different radio access technologies. The indicator is sent to source network, at 1006. Thus, method 1000 facilitates triggering a suspend control on behalf of mobile device. This can mitigate delay that might be encountered if mobile device is required to trigger the suspend request prior to leaving source network. Further, sending the suspend request on behalf of mobile device can mitigate a problem that can occur if mobile device has lost connectivity with source network.

In accordance with some aspects, method 1000 can include receiving from source network a source network page that includes a target network page and an indication that source network will suspend a current data session. Additionally or alternatively, method 1000 can include identifying movement within target network based on a change from a first globally unique temporary identifier to a second globally unique temporary identifier.

Figure 11:
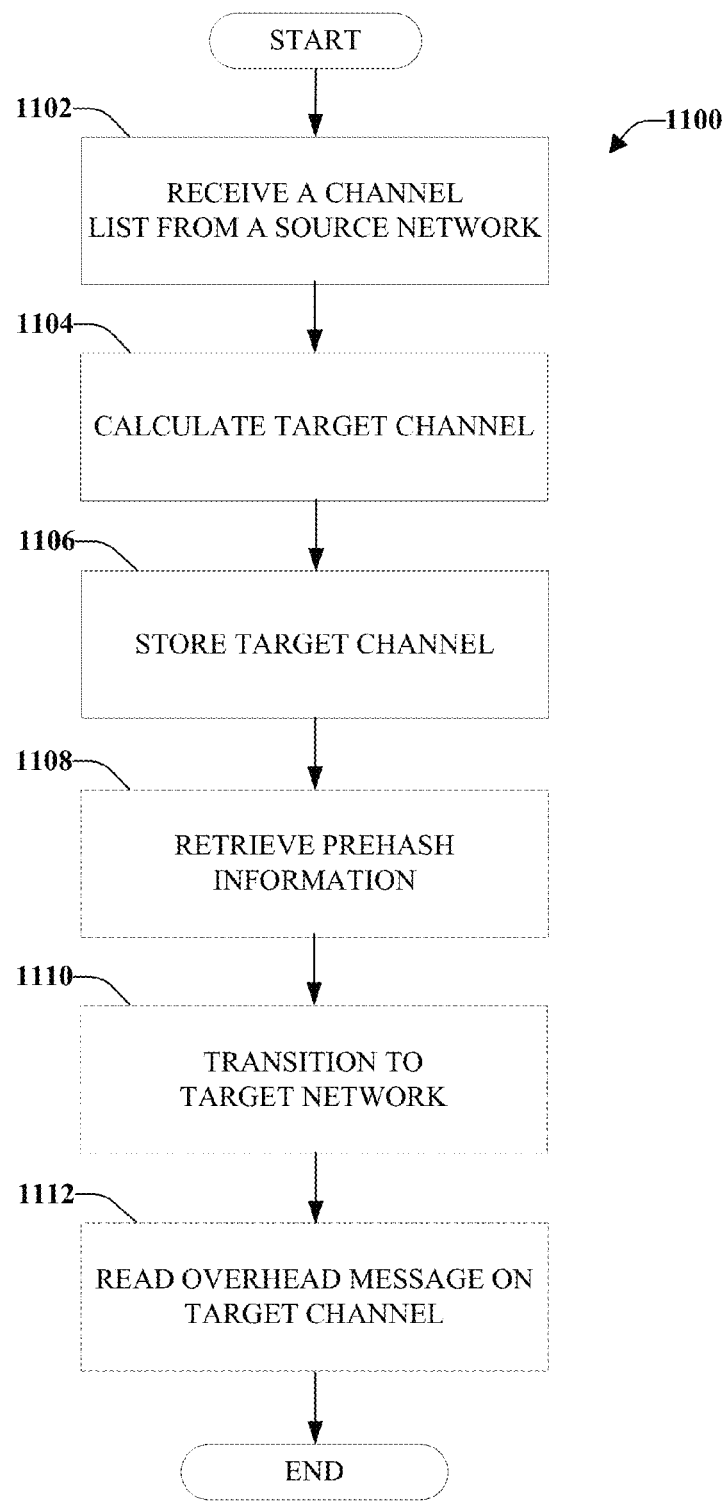
FIG. 11 illustrates a method for performing a prehash operation in anticipation of a transition to a target network, according to an aspect.

FIG. 11 illustrates a method 1100 for performing a prehash operation in anticipation of a transition to a target network, according to an aspect. At 1102, a channel list is received from a source network. The channel list includes channels associated with target network. At 1104, a target channel is calculated from the channel list. Target channel can be read after a transition to target network occurs. Target channel is stored, at 1106.

In accordance with some aspects, method 1100 can also include retrieving the prehash information, at 1108, and transitioning to target network, at 1110. An overhead message on the target channel can be read, at 1112, after transitioning to target network. In such a manner, since the information was prehashed prior to moving to target network, time can be saved after transition to target network.

Figure 12:
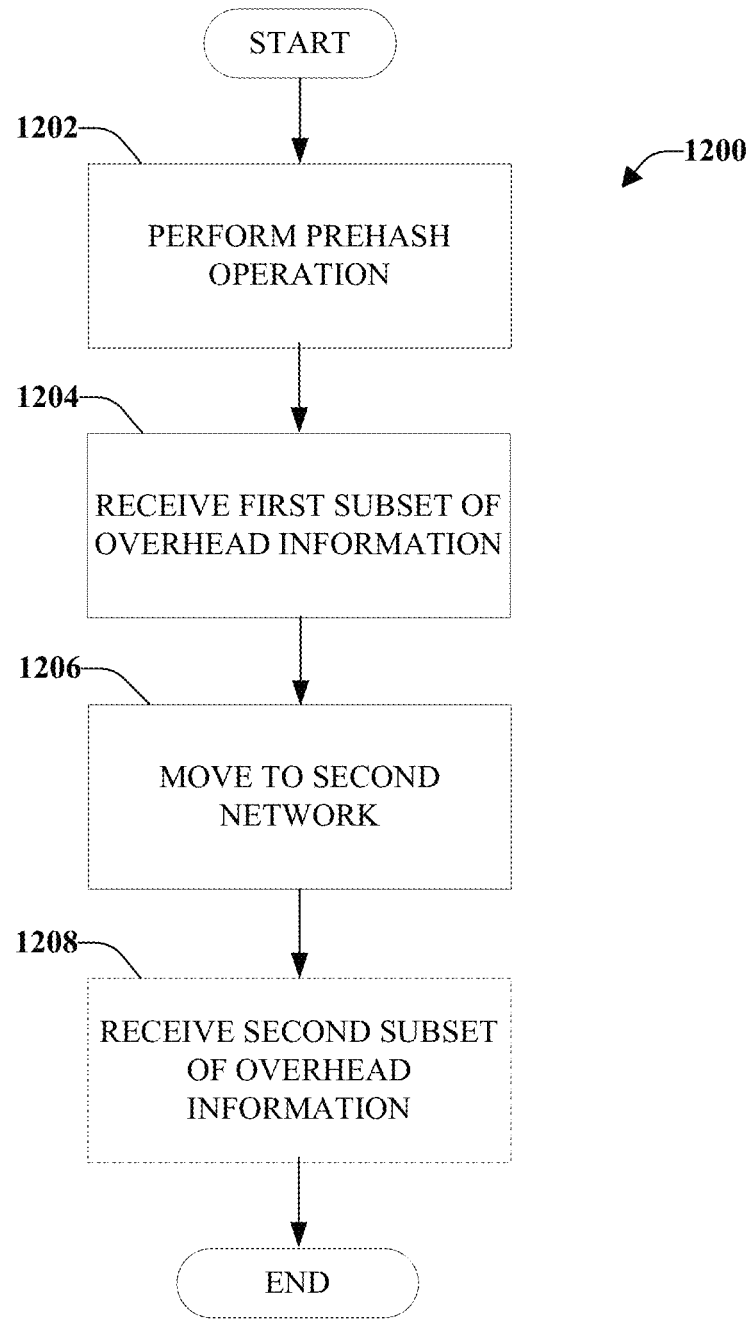
FIG. 12 illustrates a method performed by a mobile device for post reading overhead information in accordance with an aspect.

FIG. 12 illustrates a method 1200 performed by a mobile device for post reading overhead information in accordance with an aspect. At 1202, prehashing is performed (as discussed with reference to 1102, 1104, and 1106 of FIG. 11). At 1204, a first subset of an overhead information is received. The first subset of overhead information can be received from a source network.

At 1206, mobile device moves to second network and, at 1208, a second subset of the overhead information is read. Second subset of overhead information can be received from target network. In accordance with some aspects, second subset of overhead information is received in unicast form.

For example, the traffic channel assignment is obtained by mobile device though the tunnel (e.g., thorough source network). Further, mobile device goes to the actual traffic channel of target network (e.g., 1x) without reading the overhead message. Thus, before transitioning, mobile device does not have parameters that overhead message would have carried. Instead of sending as an overhead message, the message is sent in unicast mode (directly from target network (e.g., 1x) to mobile device). In this manner, mobile device avoided reading overhead messages before transitioning, which can save additional time and resources. Mobile device can avoid reading overhead messages because mobile device went into the traffic channel blindly and read the overhead message once mobile device got to the channel. This can be thought of as a post reading of overhead messages because, once in the traffic channel, mobile device reads the overhead message. The overhead messages should come early enough not to interfere with the regular operation of mobile device in its traffic mode.

Figure 13:
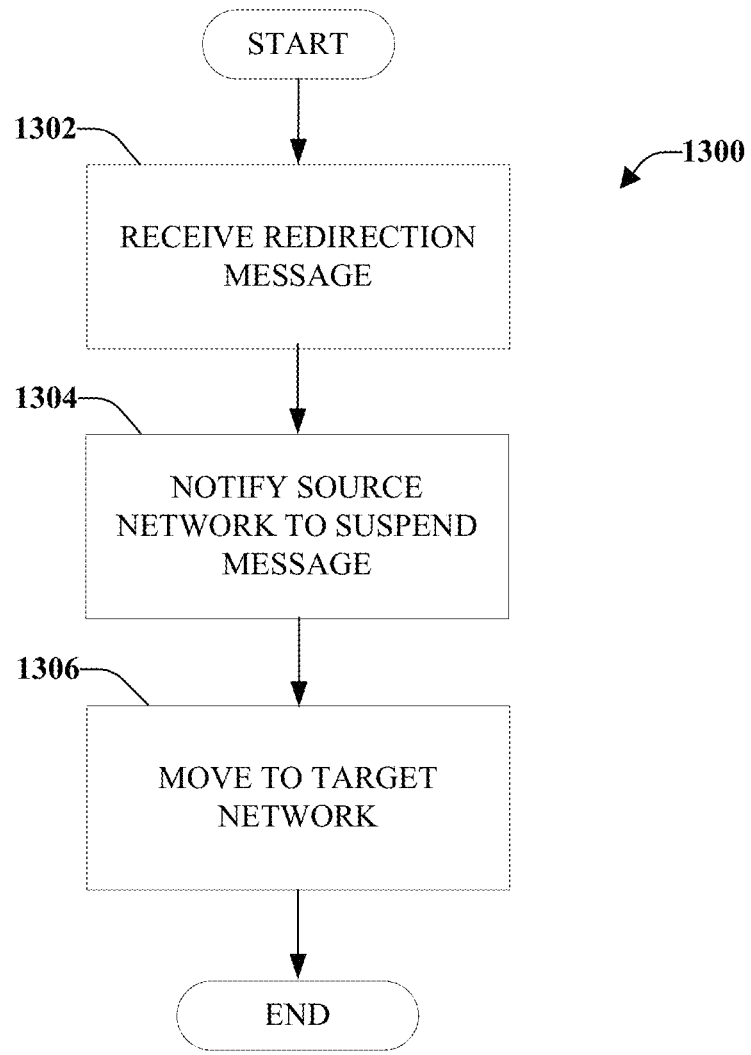
FIG. 13 illustrates a method for receiving partial target network overhead in a redirection message, according to an aspect.

FIG. 13 illustrates a method 1300 for receiving partial target network overhead in a redirection message, according to an aspect. Method 1300 can be performed by a mobile device. At 1302, a redirection message is received from a source network. Redirection message includes a channel list message. In accordance with some aspects, receiving redirection message can include receiving at least a subset of network parameters related to target network. At 1304, a notification is sent to source network to suspend a session and, at 1306, mobile device moves to target network identified in the received redirection message.

Figure 14:
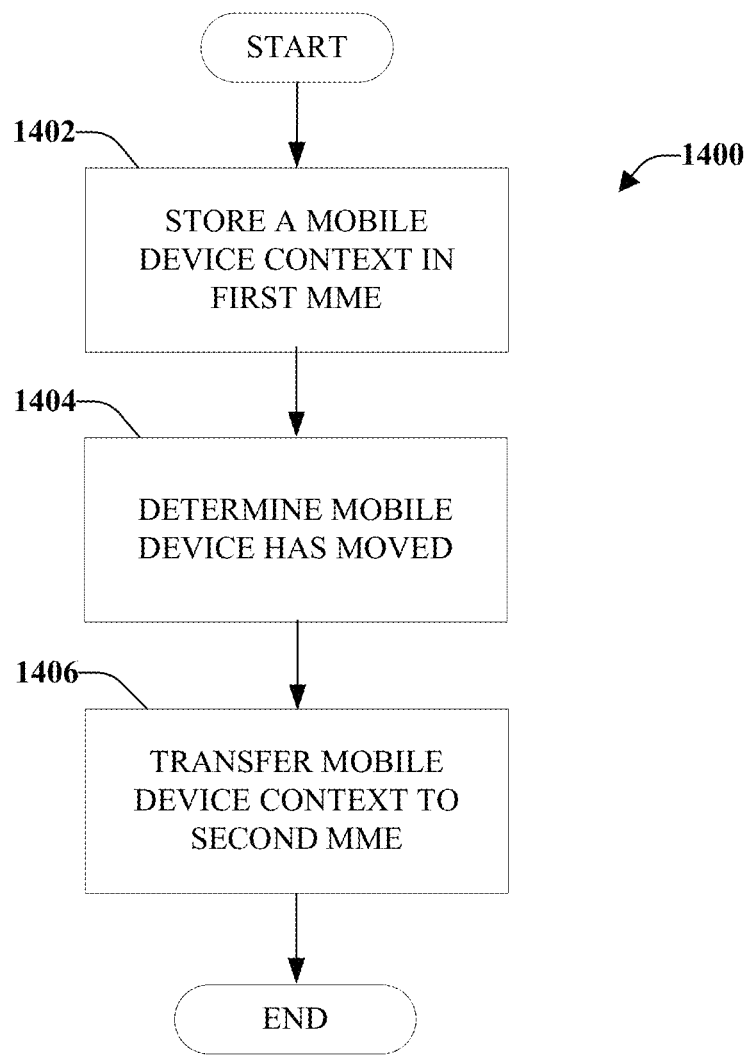
FIG. 14 illustrates a method for facilitating radio access technology interworking pre-registration procedures that can be performed by a network, according to an aspect.

With reference now to FIG. 14, illustrated is a method 1400 for facilitating radio access technology interworking pre-registration procedures and can be performed by a network, according to an aspect. Method 1400 starts, at 1402, when a mobile device context is stored in a first Mobility Management Entity of target network. At 1404, a determination is made that mobile device has moved to a second Mobility Management Entity of target network. As a function of the movement determination, at 1406, mobile device context is transferred from first Mobility Management Entity to second Mobility Management Entity.

Figure 15:
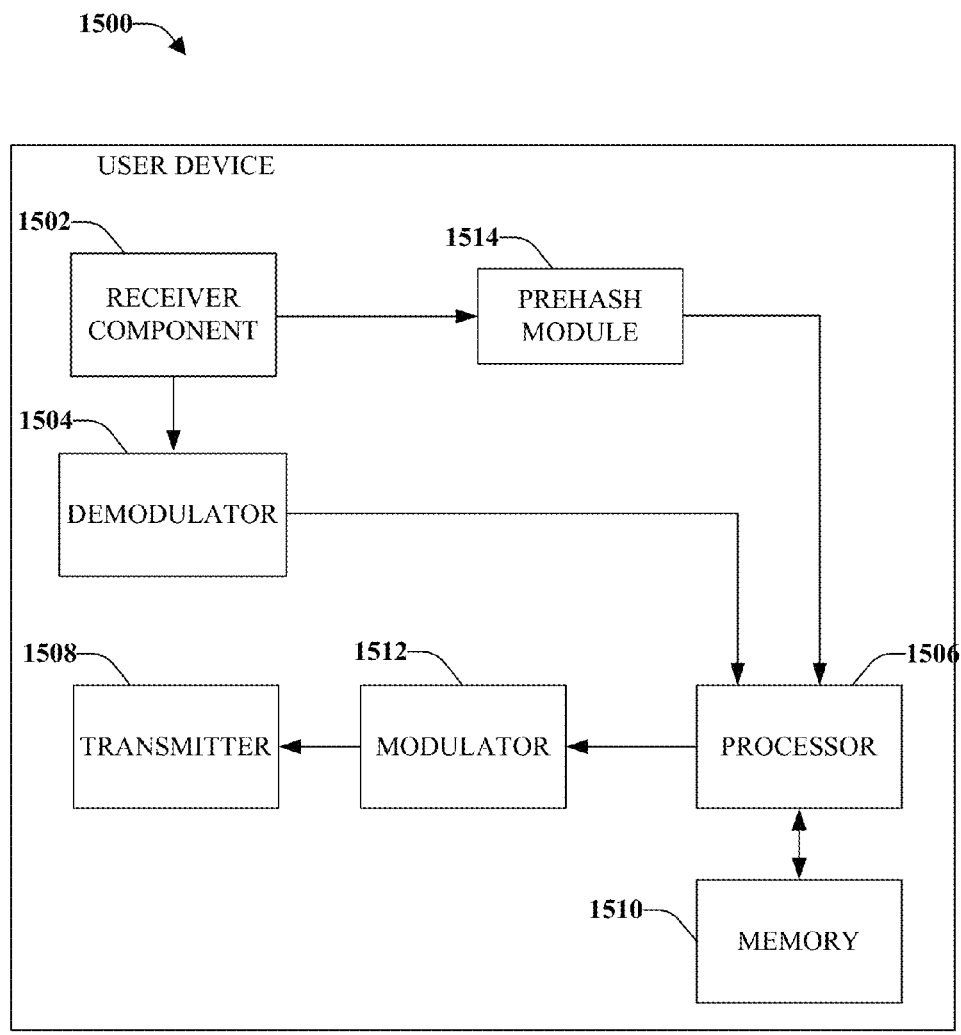
FIG. 15 illustrates a system that facilitates radio access technology interworking in accordance with one or more of the disclosed aspects.

With reference now to FIG. 15, illustrated is a system 1500 that facilitates radio access technology interworking in accordance with one or more of the disclosed aspects. System 1500 can reside in a user device. System 1500 comprises a receiver component 1502 that can receive a signal from, for example, a receiver antenna. Receiver component 1502 can perform typical actions thereon, such as filtering, amplifying, downconverting, etc. the received signal. Receiver component 1502 can also digitize the conditioned signal to obtain samples. A demodulator 1504 can obtain received symbols for each symbol period, as well as provide received symbols to a processor 1506.

Processor 1506 can be a processor dedicated to analyzing information received by receiver component 1502 and/or generating information for transmission by a transmitter 1508. In addition or alternatively, processor 1506 can control one or more components of system 1500, analyze information received by receiver component 1502, generate information for transmission by transmitter 1508, and/or control one or more components of system 1500. Processor 1506 may include a controller component capable of coordinating communications with additional user devices.

System 1500 can additionally comprise memory 1510 operatively coupled to processor 1506. Memory 1510 can store information related to coordinating communications and any other suitable information. Memory 1510 can additionally store protocols associated with radio access technology interworking. It will be appreciated that data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 1510 of the various aspects is intended to comprise, without being limited to, these and any other suitable types of memory. System 1500 can further comprise a symbol modulator 1512, wherein transmitter 1508 transmits the modulated signal.

Receiver component 1502 is further operatively coupled to a pre-hash module 1514 that selectively prehashes information related to transitioning from a source network to a target network.

In accordance with some aspects, system 1500 can be a computer program product that includes a computer-readable medium (e.g., memory 1510) that comprises codes for carrying out various aspects. Computer-readable medium can include a first set of codes for causing a computer to receive a channel list from a source network, wherein the channel list includes channels associated with a target network. Also included can be a second set of codes for causing computer to calculate a target channel as a function of the channel list and a third set of codes for causing computer to store the target channel as prehash information.

Figure 16:
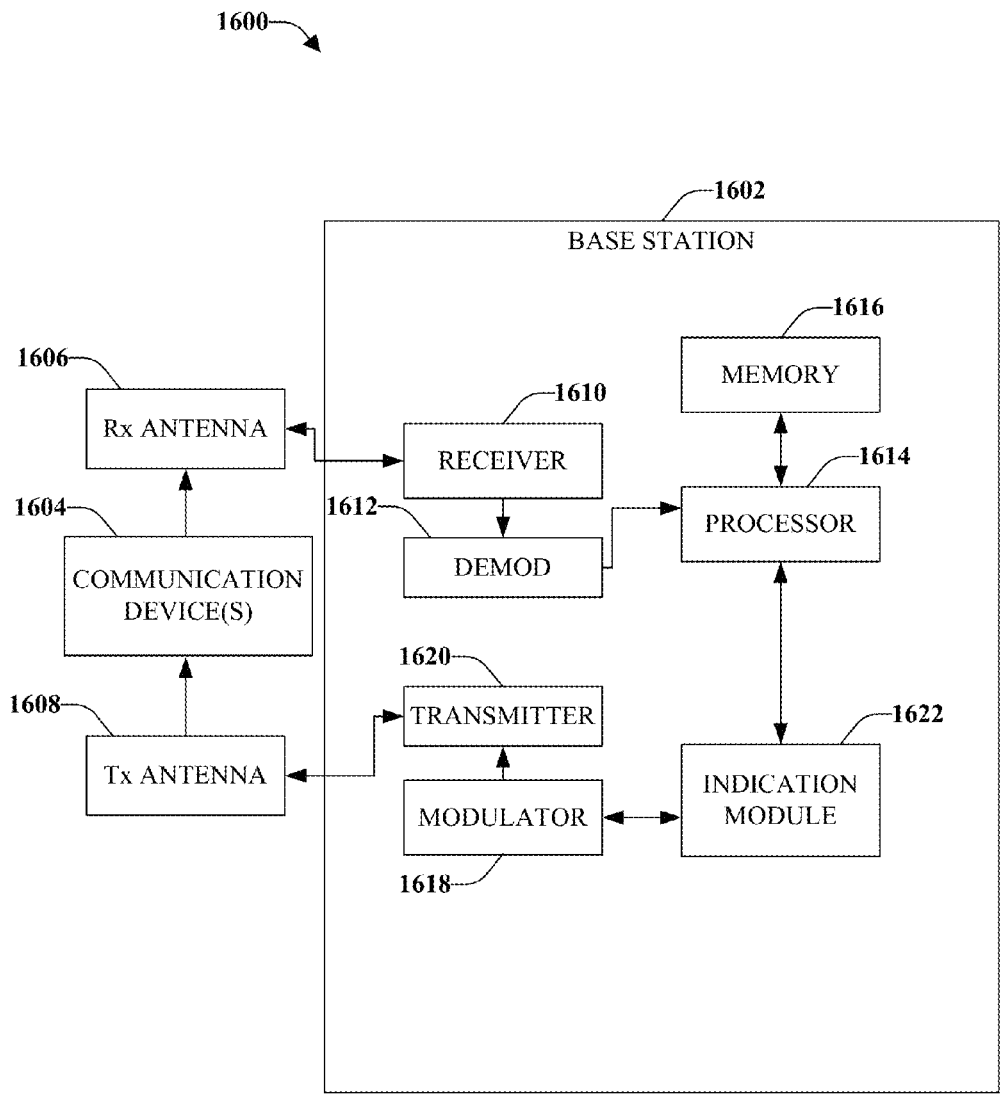
FIG. 16 illustrates a system that facilitates inter-radio access technology interworking in accordance with various aspects presented herein.

According to some aspects, computer-readable medium can include a fourth set of codes for causing computer to receive, from source network, a first subset of overhead information. Also included is a fifth set of codes for causing computer to transition to target network and a sixth set of codes for causing computer to receive, from target network, a second subset of overhead information FIG. 16 is an illustration of a system 1600 that facilitates inter-radio access technology interworking in accordance with various aspects presented herein. System 1600 comprises a base station or access point 1602. As illustrated, base station 1602 receives signal(s) from one or more communication devices 1604 (e.g., user device) by a receive antenna 1606, and transmits to the one or more communication devices 1604 through a transmit antenna 1608.

Base station 1602 comprises a receiver 1610 that receives information from receive antenna 1606 and is operatively associated with a demodulator 1612 that demodulates received information. Demodulated symbols are analyzed by a processor 1614 that is coupled to a memory 1616 that stores information related to inter-radio access technology interworking A modulator 1618 can multiplex the signal for transmission by a transmitter 1620 through transmit antenna 1608 to communication devices 1604.

Processor 1614 is further coupled to a indication module 1622 that is configured to notify a source network when a mobile device has transitioned from source network to target network.

In accordance with some aspects, system 1600 can be a computer program product that includes a computer-readable medium (e.g., memory 1616) that comprises codes for carrying out various aspects. Computer-readable medium can include a first set of codes for causing a computer to detect a registration, an origination, or a page request on a target network from a mobile device that recently left a source network. Also included is a second set of codes for causing computer to generate an indicator that includes an identity of mobile device. Further, computer-readable medium includes a third set of codes for causing computer to send the indicator to source network. The indicator triggers a suspend control on source network. Target network and source network support different radio access technologies.

In accordance with some aspects, computer-readable medium includes a fourth set of codes for causing computer to store, in a first mobility management entity, a mobile device context and a fifth set of codes for causing computer to determine mobile device has moved to a second mobility management entity. Also included is a sixth set of codes for causing computer to transfer mobile device context from first mobility management entity to second mobility management entity.

Figure 17:
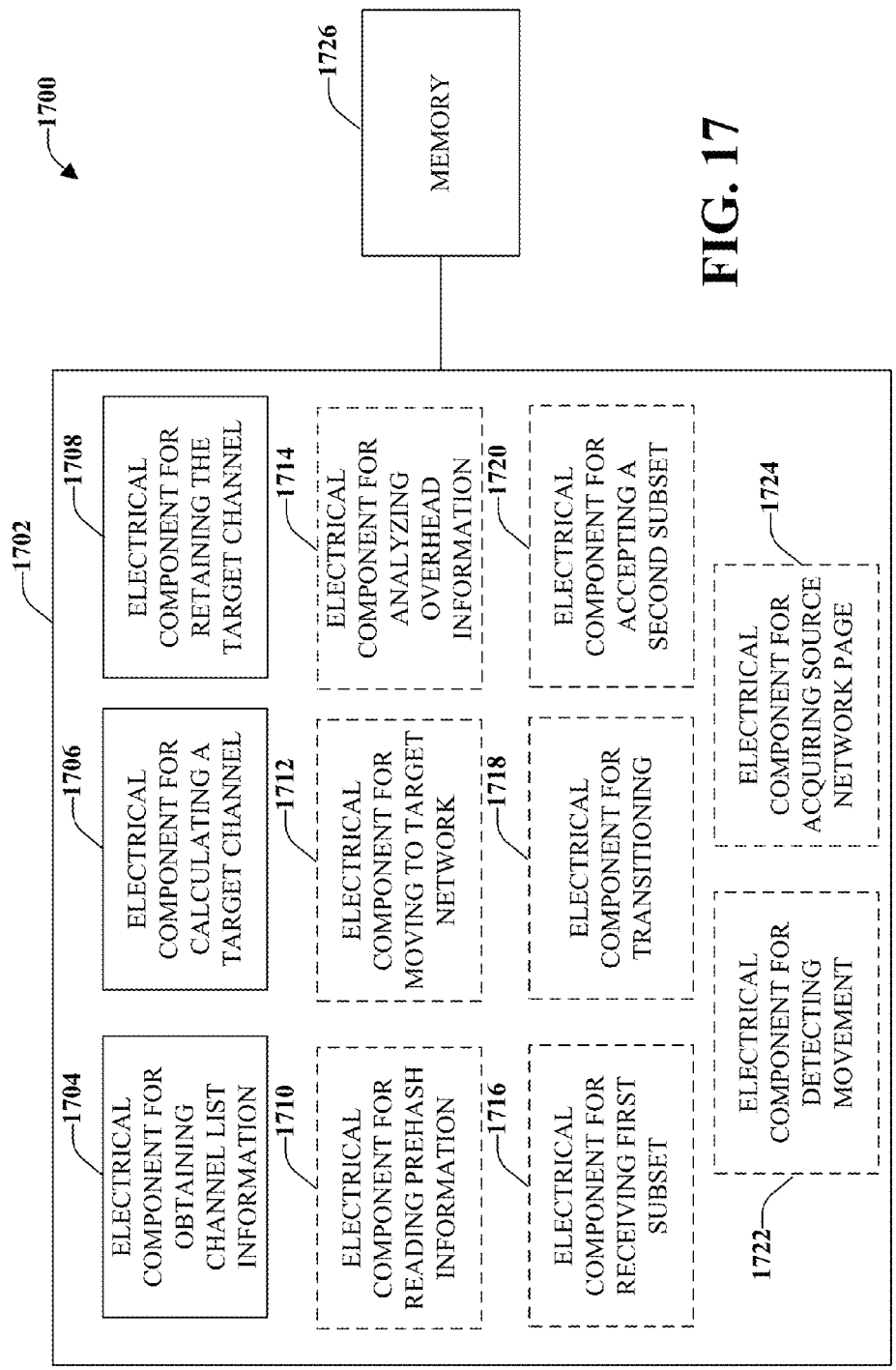
FIG. 17 illustrates an example system that facilitates transfer from a first radio access technology to a second radio access technology, according to an aspect.

With reference to FIG. 17, illustrated is an example system 1700 that facilitates transfer from a first radio access technology to a second radio access technology, according to an aspect. System 1700 may reside at least partially within a mobile device and is represented as including functional blocks, which may be functional blocks that represent functions implemented by a processor, software, or combination thereof (e.g., firmware).

System 1700 includes a logical grouping 1702 of electrical components that can act separately or in conjunction. Logical grouping 1702 includes an electrical component 1704 for obtaining a channel list from a source network. The channel list can include channels associated with a target network. Logical grouping 1702 also includes an electrical component 1706 for calculating a target channel. Target channel will be read after a transition to target network occurs. Further, logical grouping 1702 includes an electrical component 1708 for retaining the target channel that needs to be read as prehash information.

In accordance with some aspects, logical grouping 1702 also includes an electrical component 1710 for reading the prehash information and an electrical component 1712 for moving to target network. Further, logical grouping can include an electrical component 1714 for analyzing an overhead message on the target channel.

According to some aspects, logical grouping 1702 can include an electrical component 1716 for receiving a first subset of overhead information from source network and an electrical component 1718 for transitioning to target network. Also included can be an electrical component 1720 for accepting a second subset of overhead information from target network in unicast mode.

Additionally or alternatively, electrical grouping 1702 can include an electrical component 1722 for detecting movement within target network based on a change in a source indicator from a first globally unique temporary identifier to a second globally unique temporary identifier.

According to some aspects, logical grouping 1702 includes an electrical component for acquiring from source network a source network page that comprises a target network page. The target network page can be an implicit indication to source network to suspend a current data session.

Additionally, system 1700 can include a memory 1726 that retains instructions for executing functions associated with electrical components 1704, 1706, 1708, 1710, 1712, 1714, 1716, 1718, 1720, 1722, and 1724 or other components. While shown as being external to memory 1726, it is to be understood that one or more of electrical components 704, 1706, 1708, 1710, 1712, 1714, 1716, 1718, 1720, 1722, and 1724 can exist within memory 1726.

Figure 18:
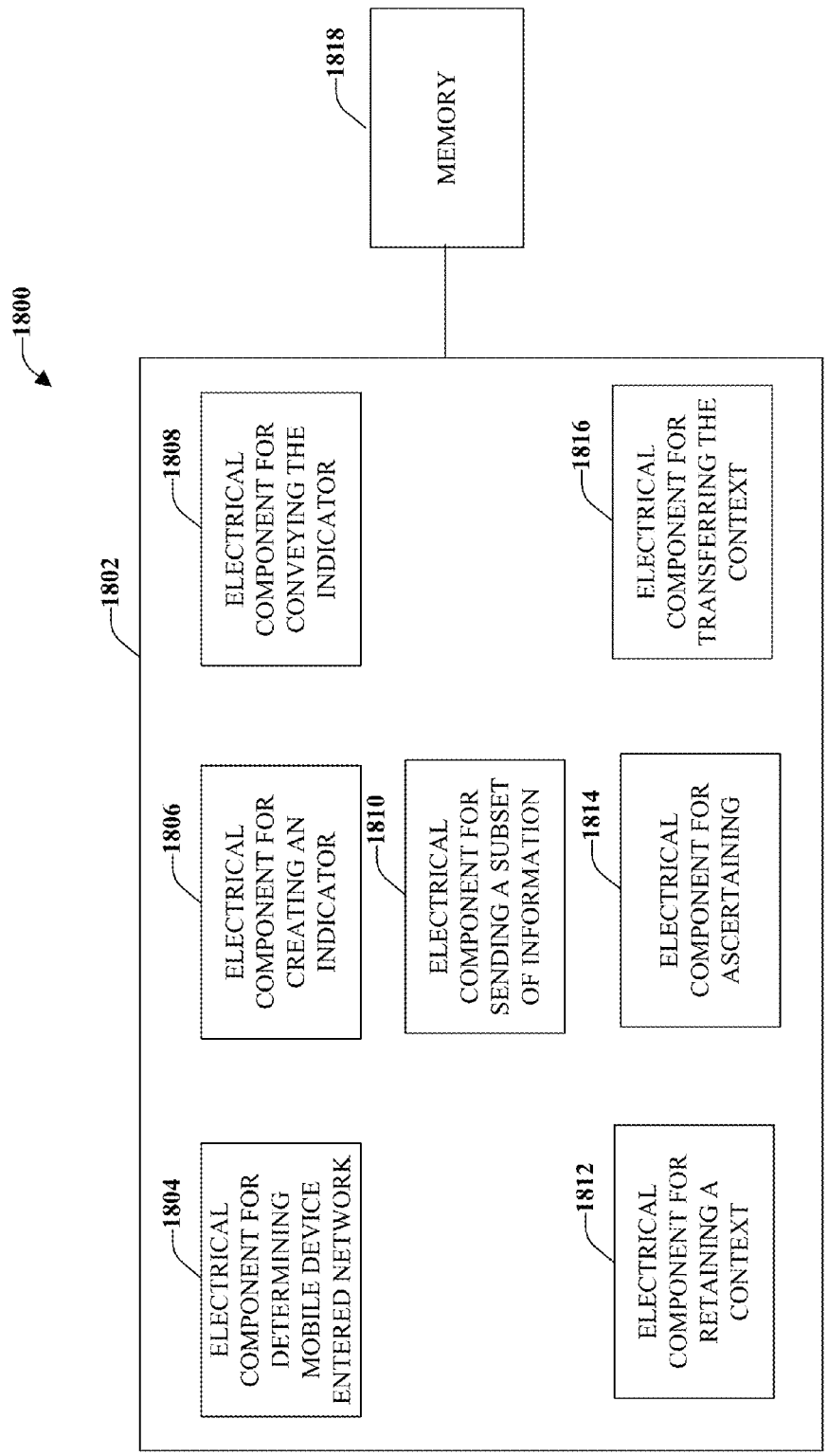
FIG. 18 illustrates an example system that notifies a first network that a mobile device has moved to a second network, according to an aspect.

With reference to FIG. 18, illustrated is an example system 1800 that notifies a first network that a mobile device has moved to a second network, according to an aspect. System 1800 may reside at least partially within a network (such as second network). System 1800 is represented as including functional blocks, which may be functional blocks that represent functions implemented by a processor, software, or combination thereof (e.g., firmware).

System 1800 includes a logical grouping 1802 of electrical components that can act separately or in conjunction. Included in logical grouping 1802 is an electrical component 1804 for determining a mobile device has entered second network (wherein mobile device moved from first network to second network). Determining mobile device has entered second network (e.g., target network) can include recognizing mobile device has performed a registration, an origination, or a page request on first network. Also included is an electrical component 1806 for creating an indicator that includes an identity of mobile device. Further, logical grouping 1802 includes an electrical component for conveying the indicator to first network. The indicator triggers a suspend control on first network.

In accordance with some aspects, logical grouping 1802 includes an electrical component 1810 for sending a subset of overhead information to mobile device after electrical component 804 determines mobile device entered target network. The subset of overhead information is sent in unicast mode.

According to some aspects, logical grouping 1802 includes an electrical component 1812 for retaining a mobile device context in a first mobility management entity and an electrical component 1814 for ascertaining mobile device has moved to a second mobility management entity. Also included in logical grouping 1802 is an electrical component 1816 for transferring mobile device context from first mobility management entity to second mobility management entity.

System 1800 can include a memory 1818 that retains instructions for executing functions associated with electrical components 1804, 1806, 1808, 1810, 1812, 1814, and 1816 or other components. While shown as being external to memory 1818, it is to be understood that one or more of electrical components 1804, 1806, 1808, 1810, 1812, 1814, and 1816 can exist within memory 1818.

Figure 19:
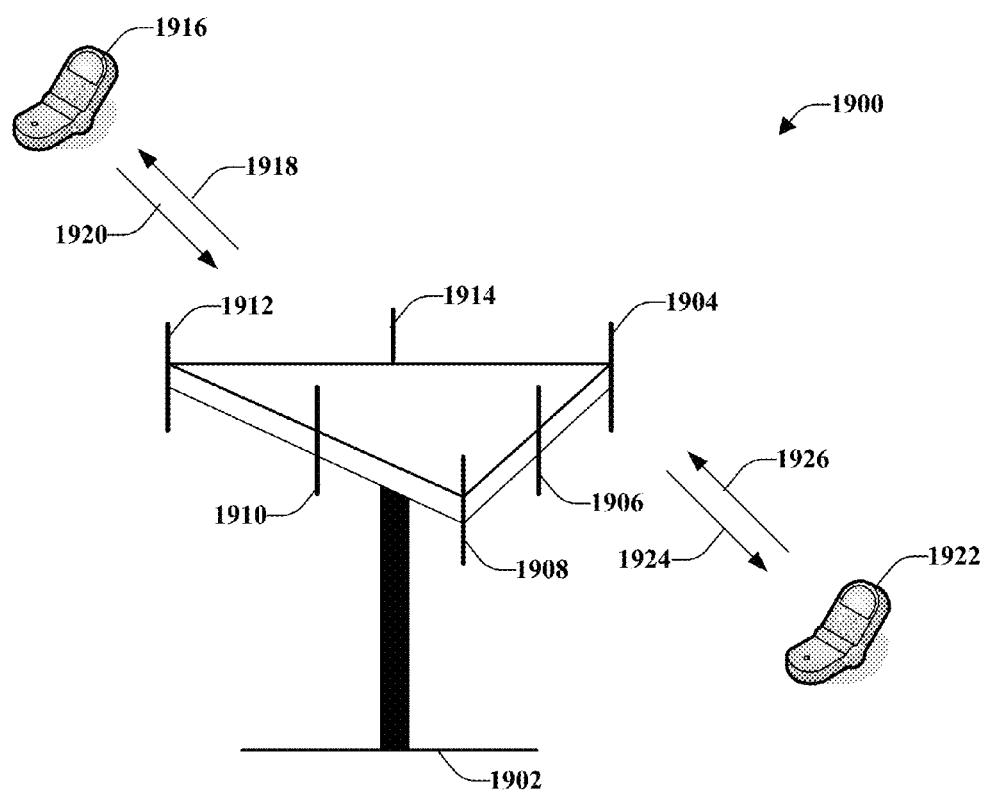
FIG. 19 illustrates a multiple access wireless communication system according to one or more aspects.

Referring now to FIG. 19, a multiple access wireless communication system 1900 according to one or more aspects is illustrated. A wireless communication system 1900 can include one or more base stations in contact with one or more user devices. Each base station provides coverage for a plurality of sectors. A three-sector base station 1902 is illustrated that includes multiple antenna groups, one including antennas 1904 and 1906, another including antennas 1908 and 1910, and a third including antennas 1912 and 1914. According to the figure, only two antennas are shown for each antenna group, however, more or fewer antennas may be utilized for each antenna group. Mobile device 1916 is in communication with antennas 1912 and 1914, where antennas 1912 and 1914 transmit information to mobile device 1916 over forward link 1918 and receive information from mobile device 1916 over reverse link 1920. Forward link (or downlink) refers to communication link from base stations to mobile devices, and reverse link (or uplink) refers to communication link from mobile devices to base stations. Mobile device 1922 is in communication with antennas 1904 and 1906, where antennas 1904 and 1906 transmit information to mobile device 1922 over forward link 1924 and receive information from mobile device 1922 over reverse link 1926. In a FDD system, for example, communication links 1918, 1920, 1924, and 1926 might utilize different frequencies for communication. For example, forward link 1918 might use a different frequency than the frequency utilized by reverse link 1920.

Each group of antennas and/or the area in which they are designated to communicate may be referred to as a sector of base station 1902. In one or more aspects, antenna groups each are designed to communicate to mobile devices in a sector or the areas covered by base station 1902. A base station may be a fixed station used for communicating with mobile devices.

In communication over forward links 1918 and 1924, transmitting antennas of base station 1902 can utilize beamforming in order to improve a signal-to-noise ratio of forward links for different mobile devices 1916 and 1922. Also, a base station utilizing beamforming to transmit to mobile devices scattered randomly through its coverage area might cause less interference to mobile devices in neighboring cells than the interference that can be caused by a base station transmitting through a single antenna to all mobile devices in its coverage area.

Figure 20:
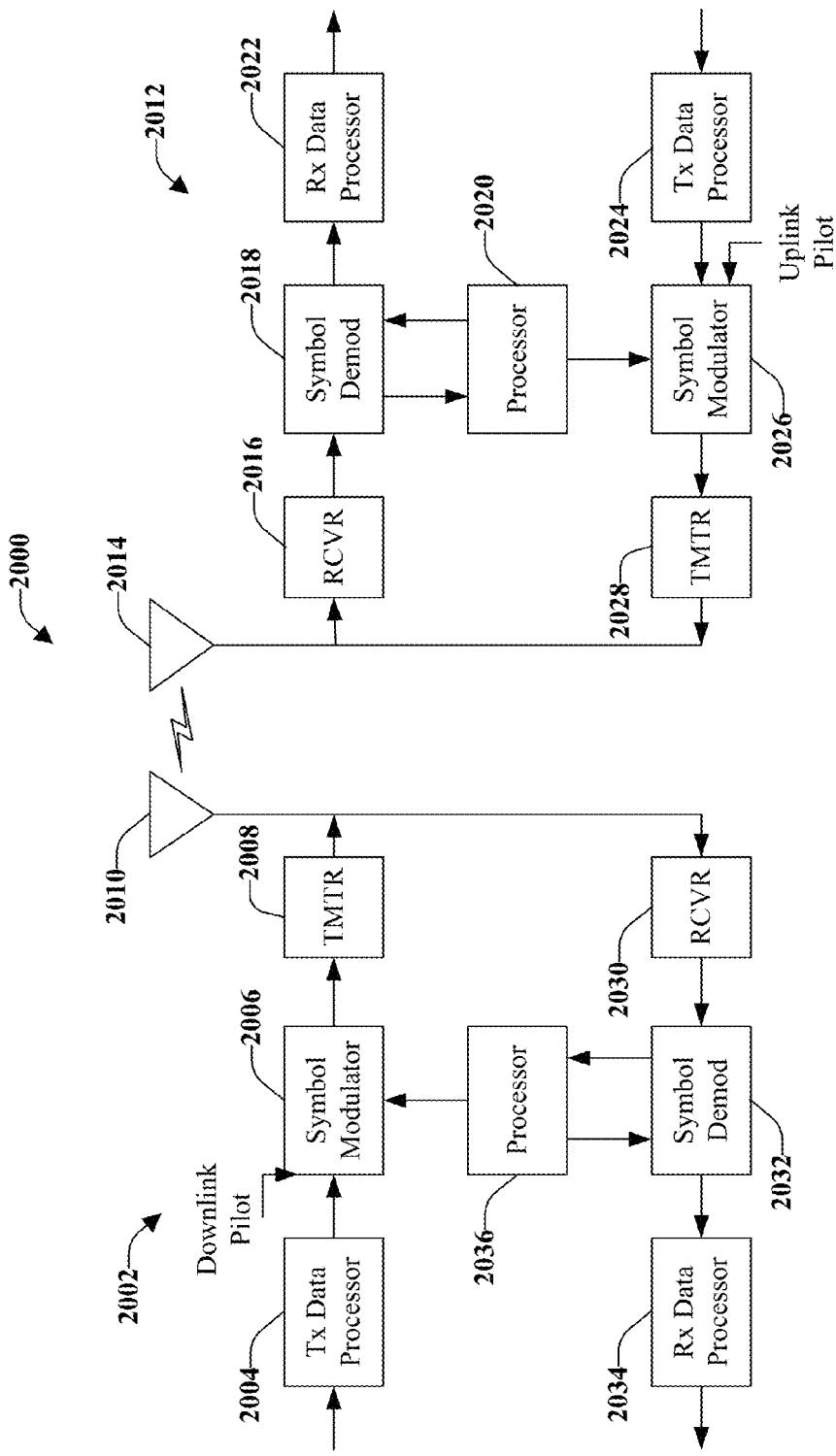
FIG. 20 illustrates an exemplary wireless communication system, according to various aspects.

FIG. 20 illustrates an exemplary wireless communication system 2000, according to various aspects. Wireless communication system 2000 depicts one base station and one terminal for sake of brevity. However, it is to be appreciated that system 2000 can include more than one base station or access point and/or more than one terminal or user device, wherein additional base stations and/or terminals can be substantially similar or different from the exemplary base station and terminal described below. In addition, it is to be appreciated that base station and/or terminal can employ various aspects described herein to facilitate wireless communication there between.

On a downlink, at access point 2002, a transmit (TX) data processor 2004 receives, formats, codes, interleaves, and modulates (or symbol maps) traffic data and provides modulation symbols ("data symbols"). A symbol modulator 2006 receives and processes data symbols and pilot symbols and provides a stream of symbols. Symbol modulator 2006 multiplexes data and pilot symbols and obtains a set of N transmit symbols. Each transmit symbol may be a data symbol, a pilot symbol, or a signal value of zero. Pilot symbols may be sent continuously in each symbol period. Pilot symbols can be frequency division multiplexed (FDM), orthogonal frequency division multiplexed (OFDM), time division multiplexed (TDM), frequency division multiplexed (FDM), or code division multiplexed (CDM).

A transmitter unit (TMTR) 2008 receives and converts the stream of symbols into one or more analog signals and further conditions (e.g., amplifies, filters, frequency upconverts, and so on) analog signals to generate a downlink signal suitable for transmission over wireless channel. Downlink signal is then transmitted through an antenna 2010 to terminals. At terminal 2012, an antenna 2014 receives downlink signal and provides a received signal to a receiver unit (RCVR) 2016. Receiver unit 2016 conditions (e.g., filters, amplifies, frequency downconverts, and so forth) received signal and digitizes conditioned signal to obtain samples. A symbol demodulator 2018 obtains N received symbols and provides received pilot symbols to a processor executing computer executable instructions 2020 for channel estimation. Symbol demodulator 2018 further receives a frequency response estimate for the downlink from processor 2020, performs data demodulation on received data symbols to obtain data symbol estimates (which are estimates of transmitted data symbols). Further, symbol demodulator 2018 provides data symbol estimates to a RX data processor 2022, which demodulates (e.g., symbol demaps), deinterleaves, and decodes data symbol estimates to recover transmitted traffic data. Processing by symbol demodulator 2018 and RX data processor 2022 is complementary to processing by symbol modulator 2006 and TX data processor 2004, respectively, at access point 2002.

On the uplink, a TX data processor 2024 processes traffic data and provides data symbols. A symbol modulator 2026 receives and multiplexes data symbols with pilot symbols, performs modulation, and provides a stream of symbols. A transmitter unit 2028 receives and processes the stream of symbols to generate an uplink signal, which is transmitted by antenna 2014 to access point 2002.

At access point 2002, uplink signal from terminal 2012 is received by antenna 2010 and processed by a receiver unit 2030 (RCVR) to obtain samples. A symbol demodulator 2032 then processes the samples and provides received pilot symbols and data symbol estimates for uplink. A RX data processor 2034 processes data symbol estimates to recover traffic data transmitted by terminal 2012. A processor executing computer executable instructions 2036 performs channel estimation for each active terminal transmitting on uplink.

Processors 2036 and 2020 direct (e.g., control, coordinate, manage, and so forth) operation at access point 2002 and terminal 2012, respectively. Respective processors 2036 and 2020 can be associated with memory units (not shown) that store program codes and data. Processors 2036 and 2020 can also perform computations to derive frequency and impulse response estimates for uplink and downlink, respectively.

For a multiple-access system (e.g., FDMA, OFDMA, CDMA, TDMA, and the like), multiple terminals can transmit concurrently on uplink. For such a system, pilot subbands may be shared among different terminals. Channel estimation techniques may be used in cases where pilot subbands for each terminal span the entire operating band (possibly except for band edges). Such a pilot subband structure would be desirable to obtain frequency diversity for each terminal. The techniques described herein may be implemented by various means. For example, these techniques may be implemented in hardware, software, or a combination thereof. For a hardware implementation, processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform functions described herein, or a combination thereof. With software, implementation can be through modules (e.g., procedures, functions, and so on) that perform functions described herein. Software codes may be stored in memory unit and executed by processors 2036 and 2020.

It is to be understood that aspects described herein may be implemented by hardware, software, firmware or any combination thereof. When implemented in software, functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor may be a microprocessor, but, in the alternative, processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described herein.

For a software implementation, techniques described herein may be implemented with modules (e.g., procedures, functions, and so on) that perform functions described herein. Software codes may be stored in memory units and executed by processors. Memory unit may be implemented within processor or external to processor, in which case memory unit can be communicatively coupled to processor through various means as is known in the art. Further, at least one processor may include one or more modules operable to perform functions described herein.

Techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform functions described herein.

Further, the steps and/or actions of a method or algorithm described in connection with aspects disclosed herein may be embodied directly in hardware, in a software module executed by a processor, or a combination thereof. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to processor, such that processor can read information from, and write information to, storage medium. In the alternative, storage medium may be integral to processor. Further, in some aspects, processor and storage medium may reside in an ASIC. Additionally, ASIC may reside in a user terminal. In the alternative, processor and storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative aspects and/or embodiments, it should be noted that various changes and modifications could be made herein without departing from the scope of described aspects and/or embodiments as defined by the appended claims. Accordingly, described aspects are intended to embrace all such alterations, modifications and variations that fall within scope of appended claims. Furthermore, although elements of described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. A method for inter radio access technology interworking, comprising:
    receiving, at a mobile device, a channel list from a source network, wherein the channel list includes a plurality of communication traffic channels for facilitating communication between the mobile device and a target network;
    calculating a target traffic channel of the target network by a processor based at least in part on performing a hash operation on one of the plurality of communication traffic channels of the received channel list, prior to the mobile device performing a handoff from the source network to the target network;
    storing the target traffic channel as prehash information;
    receiving, from the source network, a redirection message that comprises a channel list message;
    notifying the source network to suspend a session; and
    moving to the target network identified in the redirection message.

2. The method of claim 1, further comprising:
    reading the prehash information; and
    reading an overhead message on the target traffic channel.

3. The method of claim 1, further comprising:
    receiving a first subset of an overhead information; and
    receiving a second subset of the overhead information.

4. The method of claim 3, wherein receiving the first subset of the overhead information comprises receiving the first subset of the overhead information from the source network and receiving the second subset of the overhead information comprise receiving the second subset of the overhead information from the target network.

5. The method of claim 3, wherein receiving the second subset of the overhead information comprises receiving the second subset of the overhead information in a unicast mode.

6. The method of claim 1, wherein receiving, from the source network, the redirection message comprises receiving at least a subset of network parameters related to the target network.

7. The method of claim 1, further comprising:
    receiving from the source network a source network page that includes a target network page, wherein the target network page is an implicit indication to the source network to suspend a current data session.

8. The method of claim 1, further comprising:
    identifying a movement within the target network based on a change in a source indicator from a first globally unique temporary identifier to a second globally unique temporary identifier.

9. The method of claim 1, wherein the plurality of communication traffic channels are different from overhead channels of the target network.

10. A wireless communications apparatus, comprising:
    a memory that retains instructions related to:
        obtaining, from a source network, a channel list that includes a plurality of communication traffic channels for facilitating communication between the wireless communications apparatus and a target network;
        calculating a target traffic channel of the target network based at least in part on performing a hash operation on one of the plurality of communication traffic channels of the received channel list, prior to the wireless communications apparatus performing a handoff from the source network to the target network;
        storing the target traffic channel as prehash information;
        receiving a redirection message that comprises a channel list messagg:
        notifying the source network to suspend a session; and
        moving to the target network identified in the redirection message; and
    a processor, coupled to the memory, configured to execute the instructions retained in the memory.

11. The wireless communications apparatus of claim 10, wherein the memory retains further instructions related to reading the prehash information, and reading an overhead message on the target traffic channel.

12. The wireless communications apparatus of claim 10, wherein the memory retains further instructions related to receiving a first subset of an overhead information from the source network, and receiving a second subset of the overhead information from the target network.

13. The wireless communications apparatus of claim 12, wherein the memory retains further instructions related to receiving the second subset of the overhead information in a unicast mode.

14. The wireless communications apparatus of claim 10, wherein the redirection message comprises a subset of network parameters related to the target network.

15. The wireless communications apparatus of claim 10, wherein the memory retains further instructions related to receiving a source network page that includes a target network page, wherein the target network page is an implicit indication to the source network to suspend a current data session.

16. The wireless communications apparatus of claim 10, wherein the memory retains further instructions related to identifying motion within the target network based on a change in a source indicator from a first globally unique temporary identifier to a second globally unique temporary identifier.

17. A wireless communications apparatus that facilitates radio access technology interworking, comprising:
    means for obtaining a channel list from a source network, wherein the channel list includes a plurality of communication traffic channels for facilitating communication between the wireless communications apparatus and a target network;
    means for calculating a target traffic channel of the target network based at least in part on performing a hash operation on one of the plurality of communication traffic channels of the received channel list, prior to the wireless communications apparatus performing a handoff from the source network to the target network;

means for retaining the target traffic channel as prehash information;

means for receiving, from the source network, a redirection message that comprises a channel list message;

means for notifying the source network to suspend a session; and means for moving to the target network identified in the redirection message.

18. The wireless communications apparatus of claim 17, further comprising:

means for reading the prehash information; and means for analyzing an overhead message on the target traffic channel.

19. The wireless communications apparatus of claim 17, further comprising:

means for receiving a first subset of an overhead information from the source network; and means for accepting a second subset of the overhead information from the target network in unicast mode.

20. The wireless communications apparatus of claim 17, further comprising:

means for detecting a movement within the target network based on a change in a source indicator from a first globally unique temporary identifier to a second globally unique temporary identifier.

21. The wireless communications apparatus of claim 17, further comprising:

means for acquiring from the source network a source network page that includes a target network page, wherein the target network page is an implicit indication to the source network to suspend a current data session.

22. A computer program product, comprising:

a non-transitory computer-readable storage medium comprising:

a first set of codes for causing a computer to receive a channel list from a source network, wherein the channel list includes a plurality of communication traffic channels for facilitating communication between the computer and a target network;

a second set of codes for causing the computer to calculate a target traffic channel of the target network based at least in part on performing a hash operation on one of the plurality of communication traffic channels of the received channel list, prior to the computer performing a handoff from the source network to the target network;

a third set of codes for causing the computer to store the target traffic channel as prehash information;

a fourth set of codes for causing the computer to receive, from the source network, a redirection message that comprises a channel list messagg;

a fifth set of codes for causing the computer to notify the source network to suspend a session; and a sixth set of codes for causing the computer to move to the target network identified in the redirection message.

23. The computer program product of claim 22, wherein the computer-readable storage medium further comprises:

a seventh set of codes for causing the computer to receive, from the source network, a first subset of an overhead information;

and an eighth set of codes for causing the computer to receive, from the target network, a second subset of the overhead information.

24. At least one processor configured to transition between radio access technologies, comprising:

a first module for receiving a channel list from a source network, wherein the channel list includes a plurality of communication traffic channels for facilitating communication between the at least one processor and a target network;

a second module for calculating a target traffic channel of the target network based at least in part on performing a hash operation on one of the plurality of communication traffic channels of the received channel list, prior to the at least one processor performing a handoff from the source network to the target network;

a third module for storing the target traffic channel as prehash information;

a fourth module for receiving, from the source network, a redirection message that comprises a channel list message;

a fifth module for notifying the source network to suspend a session; and a sixth module for moving to the target network identified in the redirection message.

25. The at least one processor of claim 24, further comprising:

a seventh module for receiving from the source network a source network page that comprises a target network page, wherein the target network page is an implicit indication to the source network to suspend a current data session.

26. A method of wireless communications, comprising:

receiving, at a mobile device, a channel list from a source network, wherein the channel list includes a plurality of communication traffic channels for facilitating communication between the mobile device and a target network;

calculating a target traffic channel of the target network by a processor based at least in part on performing a hash operation on one of the plurality of communication traffic channels of the received channel list, prior to the mobile device performing a handoff from the source network to the target network;

storing the target traffic channel as prehash information;

receiving a first subset of overhead information in a redirection message from the source network, the redirection message comprising a channel list message;

notifying the source network to suspend a session;

transitioning to the target network identified in the redirection message; and receiving a second subset of the overhead information from the target network.

* * * * *